United States Patent
Bhattad et al.

(10) Patent No.: US 10,924,997 B2
(45) Date of Patent: *Feb. 16, 2021

(54) TECHNIQUES AND APPARATUSES FOR CONTROL CHANNEL MONITORING USING A WAKEUP SIGNAL

(71) Applicant: QUALCOMM Incorporated, San Diego, CA (US)

(72) Inventors: Kapil Bhattad, Bangalore (IN); Mungal Singh Dhanda, Slough (GB); Alberto Rico Alvarino, San Diego, CA (US); Hao Xu, Beijing (CN); Wanshi Chen, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/739,674

(22) Filed: Jan. 10, 2020

(65) Prior Publication Data

US 2020/0154356 A1    May 14, 2020

Related U.S. Application Data

(63) Continuation of application No. 15/714,149, filed on Sep. 25, 2017, now Pat. No. 10,542,491.

(30) Foreign Application Priority Data

Mar. 17, 2017 (IN) .............................. 201741009311

(51) Int. Cl.
*H04W 28/08* (2009.01)
*H04W 52/02* (2009.01)
(Continued)

(52) U.S. Cl.
CPC ....... *H04W 52/0225* (2013.01); *H04L 5/0053* (2013.01); *H04W 52/0216* (2013.01);
(Continued)

(58) Field of Classification Search
None
See application file for complete search history.

(56) References Cited

U.S. PATENT DOCUMENTS

| 10,542,491 B2 | 1/2020 | Bhattad et al. |
| 2008/0207229 A1 | 8/2008 | Cave et al. |

(Continued)

OTHER PUBLICATIONS

CATT: "Motivation of UE Wakeup Mechanism in NR", 3GPP Draft; RP-170410 WUS Motivation, 3rd Generation Partnership Project (3GPP), Mobile Competence Centre ; 650, Route Des Lucioles ; F-06921 Sophia-Antipolis Cedex; France, vol. TSG RAN, No. Dubrovnik, Croatia; Mar. 6, 2017-Mar. 9, 2017 Mar. 5, 2017 (Mar. 5, 2017), Slides 7, XP051233841, Retrieved from the Internet: URL:http://www.3gpp.org/ftp/Meetings_3GPP_SYNC/RAN/Docs/.

(Continued)

*Primary Examiner* — Brandon M Renner
(74) *Attorney, Agent, or Firm* — Changwoo Yang

(57) ABSTRACT

Techniques described herein use a wakeup signal to indicate to a user equipment (UE) whether an upcoming control channel signal resource includes information relevant to the UE. In this way, the UE can wake up to perform complex control channel signal processing only when the control channel includes signals relevant to the UE, thereby conserving battery power and resources of the UE. Such techniques are particularly suited to MTC UEs, NB-IoT UEs, and/or the like, which may communicate with a network only occasionally, and which may be located in remote locations where changing or recharging a battery is difficult.

27 Claims, 15 Drawing Sheets

(51) Int. Cl.

| | | |
|---|---|---|
| *H04W 72/08* | (2009.01) | |
| *H04W 76/28* | (2018.01) | |
| *H04L 5/00* | (2006.01) | |
| H04W 72/12 | (2009.01) | |
| H04W 72/04 | (2009.01) | |
| H04W 24/02 | (2009.01) | |
| H04W 48/16 | (2009.01) | |
| H04W 74/00 | (2009.01) | |

(52) U.S. Cl.
CPC ......... *H04W 72/082* (2013.01); *H04W 76/28* (2018.02); *H04L 5/0091* (2013.01); *H04W 24/02* (2013.01); *H04W 48/16* (2013.01); *H04W 72/042* (2013.01); *H04W 72/1278* (2013.01); *H04W 74/006* (2013.01); *Y02D 30/70* (2020.08)

(56) References Cited

U.S. PATENT DOCUMENTS

| | | |
|---|---|---|
| 2013/0010619 A1 | 1/2013 | Fong et al. |
| 2016/0135152 A1 | 5/2016 | Cheng et al. |
| 2017/0094600 A1 | 3/2017 | Min et al. |
| 2017/0257789 A1* | 9/2017 | Mizusawa ............ H04W 72/005 |
| 2018/0176810 A1 | 6/2018 | Thangarasa et al. |
| 2018/0192373 A1 | 7/2018 | Fang et al. |
| 2018/0220485 A1 | 8/2018 | Su et al. |
| 2018/0368121 A1 | 12/2018 | Hussain et al. |
| 2019/0029005 A1 | 1/2019 | Bendlin et al. |
| 2020/0092814 A1* | 3/2020 | Zhou .................... H04L 5/00 |

OTHER PUBLICATIONS

Ericsson: "On a Wake-Up Signal for Active Mode UEs", 3GPP Draft; R1-1703290, 3rd Generation Partnership Project (3GPP), Mobile Competence Centre; 650, Route Des Lucioles; F-06921, Sophia-Antipolis Cedex; France, vol. RAN WG1, No. Athens, Greece; Feb. 13, 2017-Feb. 17, 2017, Feb. 12, 2017 (Feb. 12, 2017), pp. 1-2, XP051210420, Retrieved from the Internet: URL:http://www.3gpp.org/ftp/Meetings_3GPP_SYNC/RAN1/Docs/.

Huawei et al., "Discussion on wake up signal", 3GPP Draft; R1-1703333, 3rd Generation Partnership Project (3GPP), Mobile Competence Centre ; 650, Route Des Lucioles; F-06921 Sophia-Antipolis Cedex; France vol. RAN WG1, No. Athens, Greece; Feb. 13, 2017-Feb. 17, 2017, Feb. 12, 2017 (Feb. 12, 2017), pp. 5, XP051210463, Retrieved from the Internet: URL:http://www.3gpp.org/ftp/Meetings_3GPP_SYNC/RAN1/Docs/.

International Search Report and Written Opinion—PCT/US2018/018712—ISA/EPO—dated May 23, 2018.

Qualcomm Incorporated: "UE Power Evaluation for DRX with Wake-Up Signaling", 3GPP Draft; R1-1700820, 3rd Generation Partnership Project (3GPP), Mobile Competence Centre, 650, Route Des Lucioles, F-06921, Sophia-Antipolis Cedex, vol. RAN WG1, No. Spokane, U.S.A; Jan. 16, 2017-Jan. 20, 2017, Jan. 16, 2017 (Jan. 16, 2017), pp. 7, XP051208339, Retrieved from the Internet: URL:http://www.3gpp.orgjftp/Meetings_3GPP_SYNC/RAN1/Docs/.

* cited by examiner

TECHNIQUES AND APPARATUSES FOR CONTROL CHANNEL MONITORING USING A WAKEUP SIGNAL

CROSS-REFERENCE TO RELATED APPLICATIONS UNDER 35 U.S.C. § 119

This application is a continuation of U.S. patent application Ser. No. 15/714,149, entitled "TECHNIQUES AND APPARATUSES FOR CONTROL CHANNEL MONITORING USING A WAKEUP SIGNAL," filed Sep. 25, 2017 (now U.S. Pat. No. 10,542,491), which claims priority to Indian Patent Application No. 201741009311, entitled "TECHNIQUES AND APPARATUSES FOR CONTROL CHANNEL MONITORING USING A WAKEUP SIGNAL," filed Mar. 17, 2017, which are hereby expressly incorporated by reference herein.

BACKGROUND

Field

Aspects of the present disclosure generally relate to wireless communication, and more particularly to techniques and apparatuses for control channel monitoring using a wakeup signal.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

When in an idle mode or a connected mode discontinuous reception (CDRX) mode, a UE may enter a low power state to conserve battery power, and may periodically wake up to monitor a control channel for signals relating to the UE, such as pages. However, such control channel monitoring may be resource intensive and may consume battery power because the control channel uses complex signals that include a large amount of information. For example, the UE may wake up, search for signals on the control channel, decode the signals if the signals are found, and determine whether the decoded signals are relevant to the UE. If the decoded control channel signals are not relevant to the UE or if no control channel signal is found, then the battery power used to search for, receive, and decode the control channel signals is wasted.

SUMMARY

Techniques described herein use a wakeup signal to indicate to a UE whether an upcoming control channel signal resource includes information relevant to the UE. In this way, the UE wakes up to perform complex control channel signal processing only when the control channel includes signals relevant to the UE, thereby conserving battery power and resources of the UE. Such techniques are particularly suited to machine-type communication (MTC) UEs, narrowband Internet of Things (NB-IoT) UEs, and/or the like, which may communicate with a network only occasionally, and which may be located in remote locations where changing or recharging a battery is difficult.

In an aspect of the disclosure, a method, a user equipment, a base station, an apparatus, and a computer program product are provided.

In some aspects, the method may include identifying, by a user equipment (UE), a wakeup signal resource associated with the UE based at least in part on a control channel search space resource associated with the UE, wherein the wakeup signal resource maps to the control channel search space resource and precedes the control channel search space resource; monitoring, by the UE, the wakeup signal resource for an indication of whether to monitor the control channel search space resource; and selectively monitoring, by the UE, the control channel search space resource based at least in part on the indication of whether to monitor the control channel search space resource.

In some aspects, the method may include identifying, by a base station, a wakeup signal resource associated with a UE based at least in part on a control channel search space resource associated with the UE, wherein the wakeup signal resource maps to the control channel search space resource and precedes the control channel search space resource; determining, by the base station, whether a control channel search space, associated with the control channel search space resource, is to include control information associated with the UE; and selectively transmitting, by the base station, a wakeup signal in the wakeup signal resource based at least in part on determining whether the control channel search space is to include control information associated with the UE.

In some aspects, the UE may include a memory and one or more processors coupled to the memory. The one or more processors may be configured to identify a wakeup signal resource associated with the UE based at least in part on a control channel search space resource associated with the UE, wherein the wakeup signal resource maps to the control channel search space resource and precedes the control channel search space resource; monitor the wakeup signal resource for an indication of whether to monitor the control channel search space resource; and selectively monitor the control channel search space resource based at least in part on the indication of whether to monitor the control channel search space resource.

In some aspects, the base station may include a memory and one or more processors coupled to the memory. The one or more processors may be configured to identify a wakeup signal resource associated with a UE based at least in part on a control channel search space resource associated with the UE, wherein the wakeup signal resource maps to the control channel search space resource and precedes the control channel search space resource; determine whether a control channel search space, associated with the control channel search space resource, is to include control information associated with the UE; and selectively transmit a wakeup signal in the wakeup signal resource based at least in part on determining whether the control channel search space is to include control information associated with the UE.

In some aspects, the apparatus may include means for identifying a wakeup signal resource associated with the apparatus based at least in part on a control channel search space resource associated with the apparatus, wherein the wakeup signal resource maps to the control channel search space resource and precedes the control channel search space resource; means for monitoring the wakeup signal resource for an indication of whether to monitor the control channel search space resource; and means for selectively monitoring the control channel search space resource based at least in part on the indication of whether to monitor the control channel search space resource.

In some aspects, the apparatus may include means for identifying a wakeup signal resource associated with a UE based at least in part on a control channel search space resource associated with the UE, wherein the wakeup signal resource maps to the control channel search space resource and precedes the control channel search space resource; means for determining whether a control channel search space, associated with the control channel search space resource, is to include control information associated with the UE; and means for selectively transmitting a wakeup signal in the wakeup signal resource based at least in part on determining whether the control channel search space is to include control information associated with the UE.

In some aspects, the computer program product may include one or more instructions for wireless communication. The one or more instructions, when executed by one or more processors, may cause the one or more processors to identify a wakeup signal resource associated with a UE based at least in part on a control channel search space resource associated with the UE, wherein the wakeup signal resource maps to the control channel search space resource and precedes the control channel search space resource; monitor the wakeup signal resource for an indication of whether to monitor the control channel search space resource; and selectively monitor the control channel search space resource based at least in part on the indication of whether to monitor the control channel search space resource.

In some aspects, the computer program product may include one or more instructions for wireless communication. The one or more instructions, when executed by one or more processors, may cause the one or more processors to identify a wakeup signal resource associated with a UE based at least in part on a control channel search space resource associated with the UE, wherein the wakeup signal resource maps to the control channel search space resource and precedes the control channel search space resource; determine whether a control channel search space, associated with the control channel search space resource, is to include control information associated with the UE; and selectively transmit a wakeup signal in the wakeup signal resource based at least in part on determining whether the control channel search space is to include control information associated with the UE.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
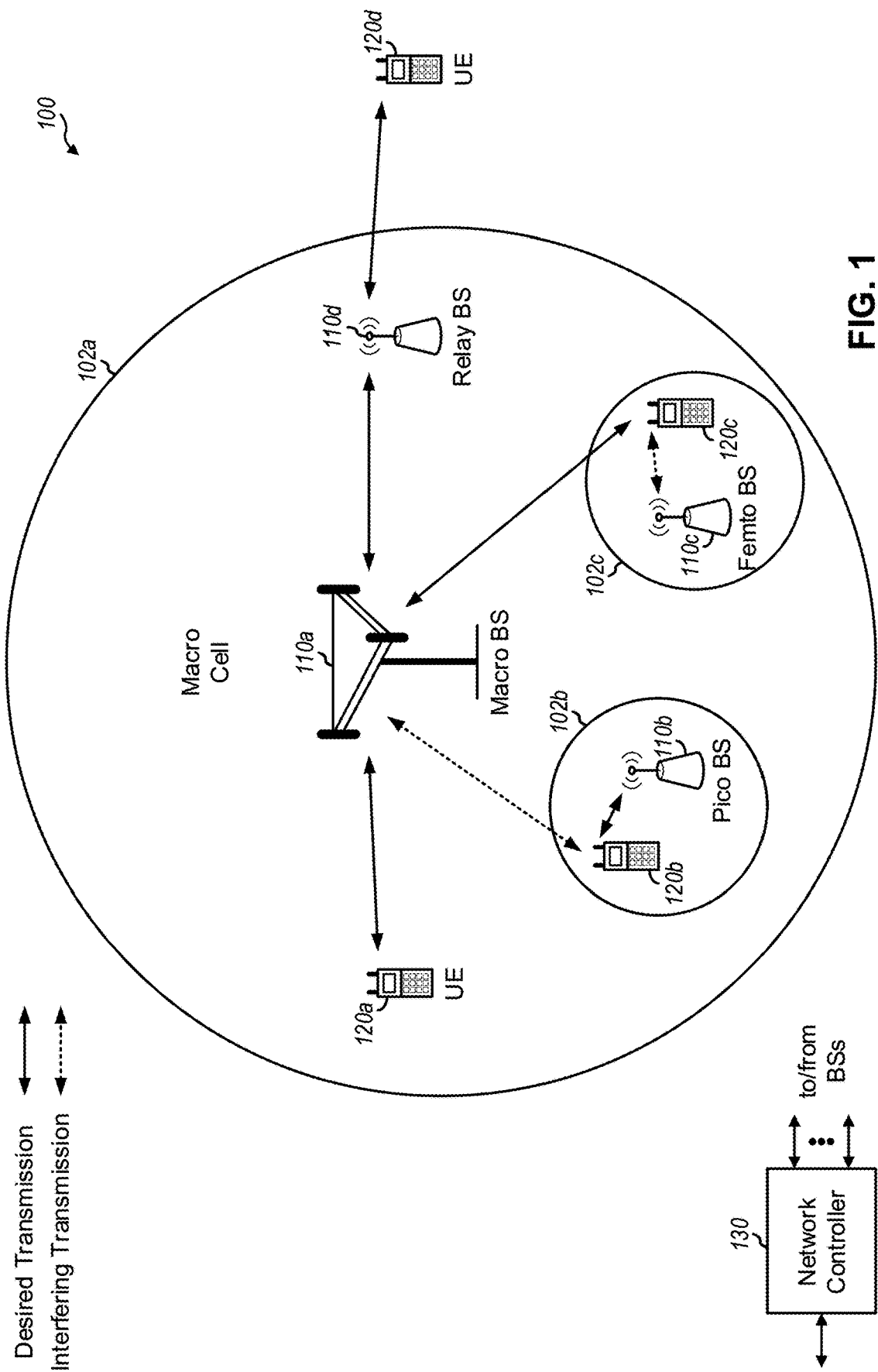
FIG. 1 is diagram illustrating an example of a wireless communication network.

The detailed description set forth below in connection with the appended drawings is intended as a description of various configurations and is not intended to represent the only configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a 5G BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices, enhanced MTC (eMTC) devices, LTE category M1 (LTE-M) devices, machine to machine (M2M) devices, and/or the like.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Techniques described herein use a wakeup signal to indicate to a UE 120 whether an upcoming control channel signal resource includes information relevant to the UE 120. In this way, the UE 120 wakes up to perform complex control channel signal processing only when the control channel includes signals relevant to the UE 120, thereby conserving battery power and resources of the UE 120. Such techniques are particularly suited to MTC UEs 120, NB-IoT UEs 120, and/or the like, which may communicate with a network only occasionally, and which may be located in remote locations where changing or recharging a battery is difficult.

As indicated above, FIG. 1 is provided merely as an example. Other examples are possible and may differ from what was described with regard to FIG. 1.

Figure 2:
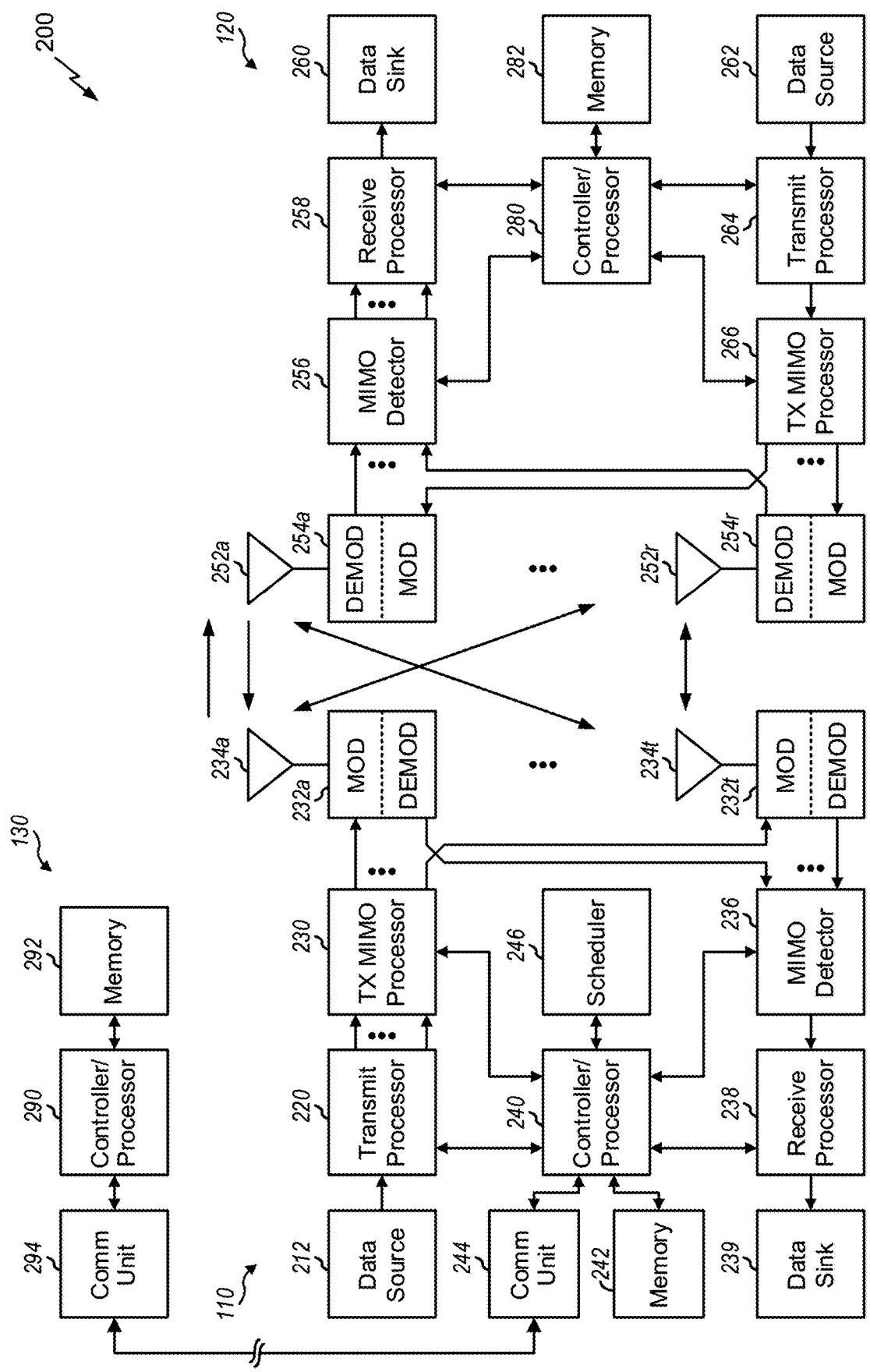
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to certain aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive (RX) processor 238 to obtain decoded data and control information sent by UE 120. RX processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to perform control channel monitoring using a wakeup signal. For example, controller/processor 280 and/or other processors and modules at base station 110, may perform or direct operations of UE 120 to perform control channel monitoring using a wakeup signal. For example, controller/processor 280 and/or other controllers/processors and modules at BS 110 may perform or direct operations of, for example, method 1100 of FIG. 11, method 1200 of FIG. 12, and/or other processes as described herein. In some aspects, one or more of the components shown in FIG. 2 may be employed to perform example method 1100 of FIG. 11, method 1200 of FIG. 12, and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
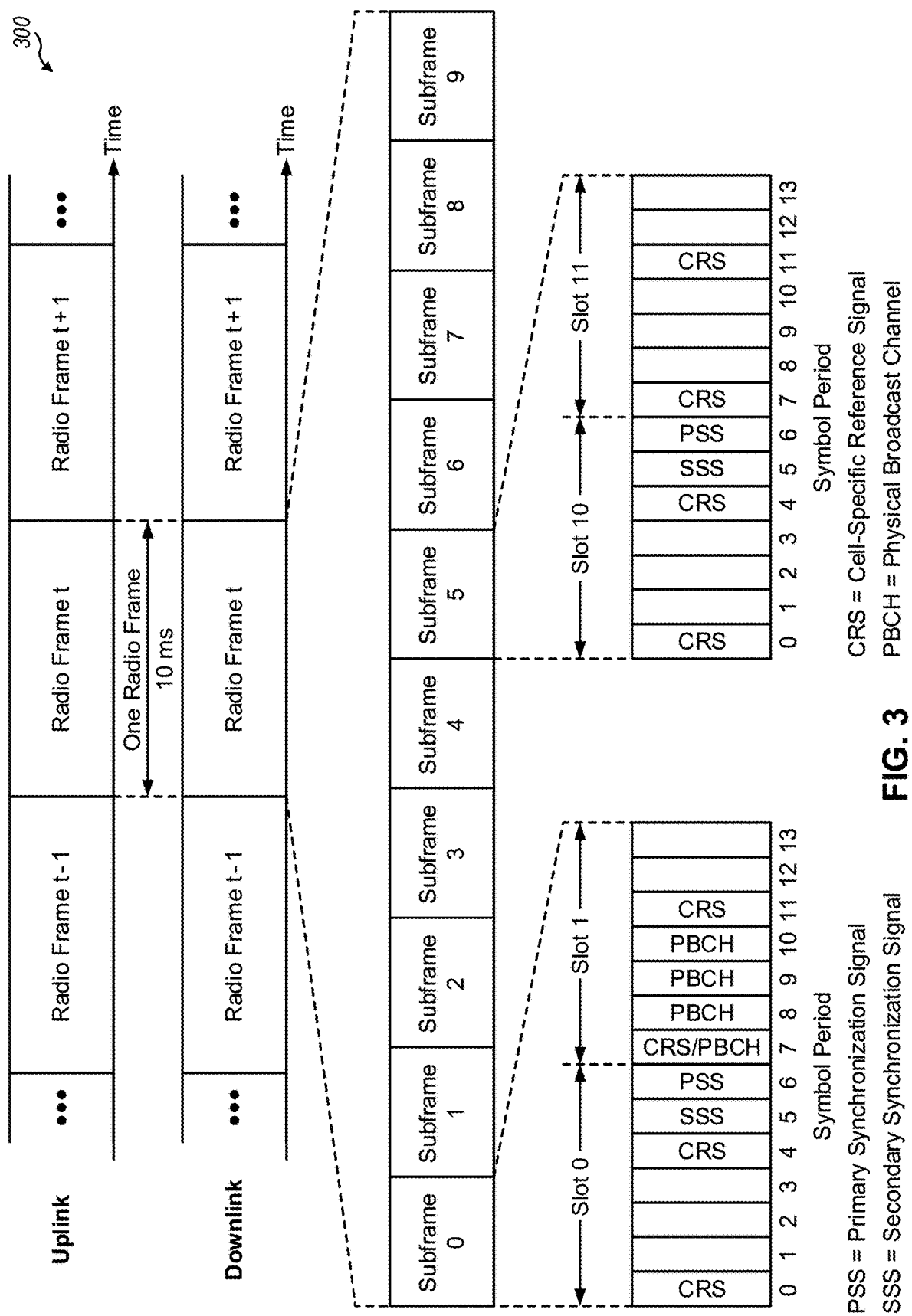
FIG. 3 is a diagram illustrating an example of a frame structure in a wireless communication network.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe. In some aspects, a wakeup signal may indicate whether the control information/data on the PDCCH is relevant to a UE.

In other systems (e.g., such as 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
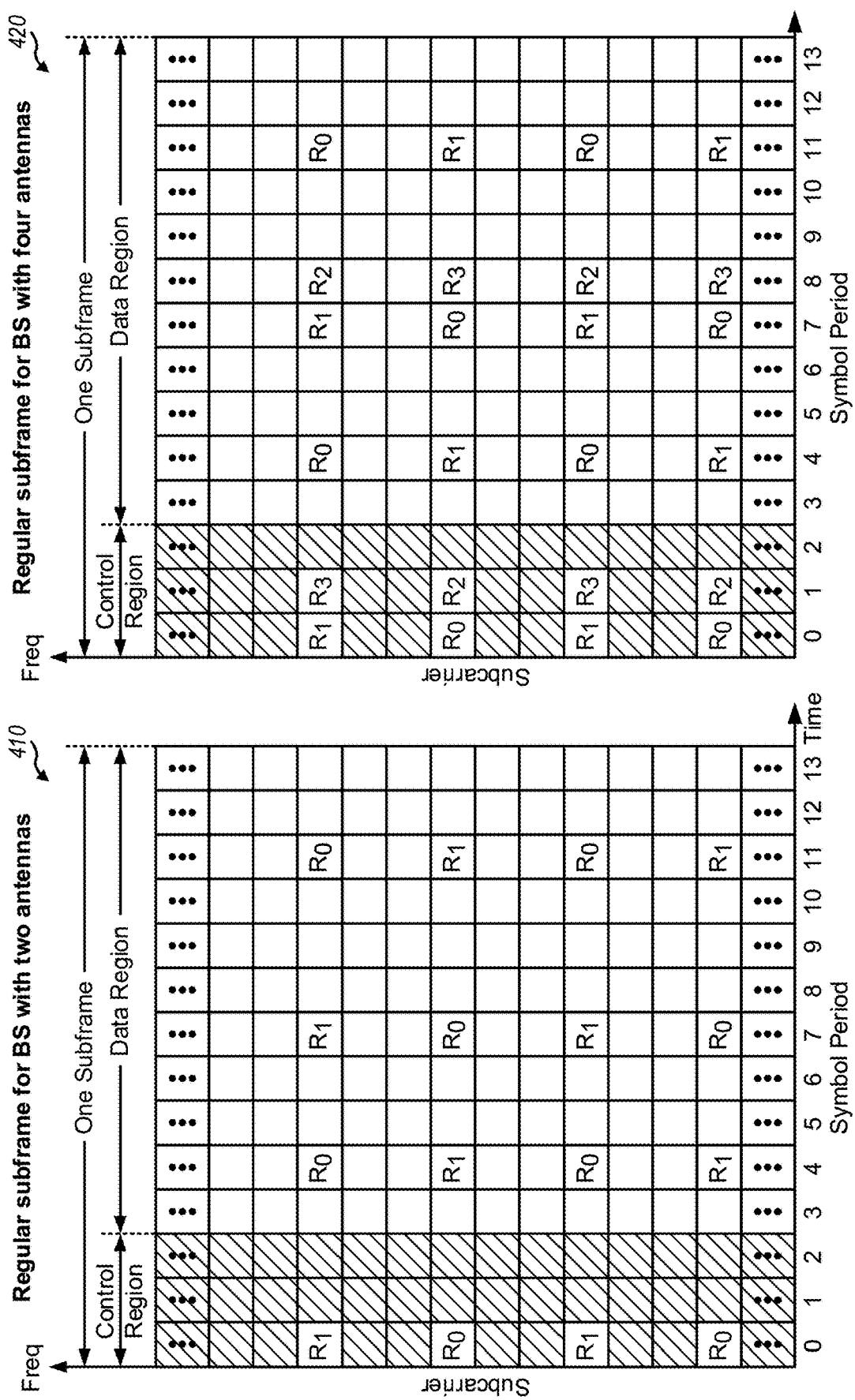
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as 5G technologies.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting nonbackward compatible MTC techniques, and/or mission critical targeting ultra reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for 5G may be as described in more detail below with respect to FIGS. 7 and 8, and may include control channel search space resources that map to wakeup signal resources, as described in more detail elsewhere herein.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
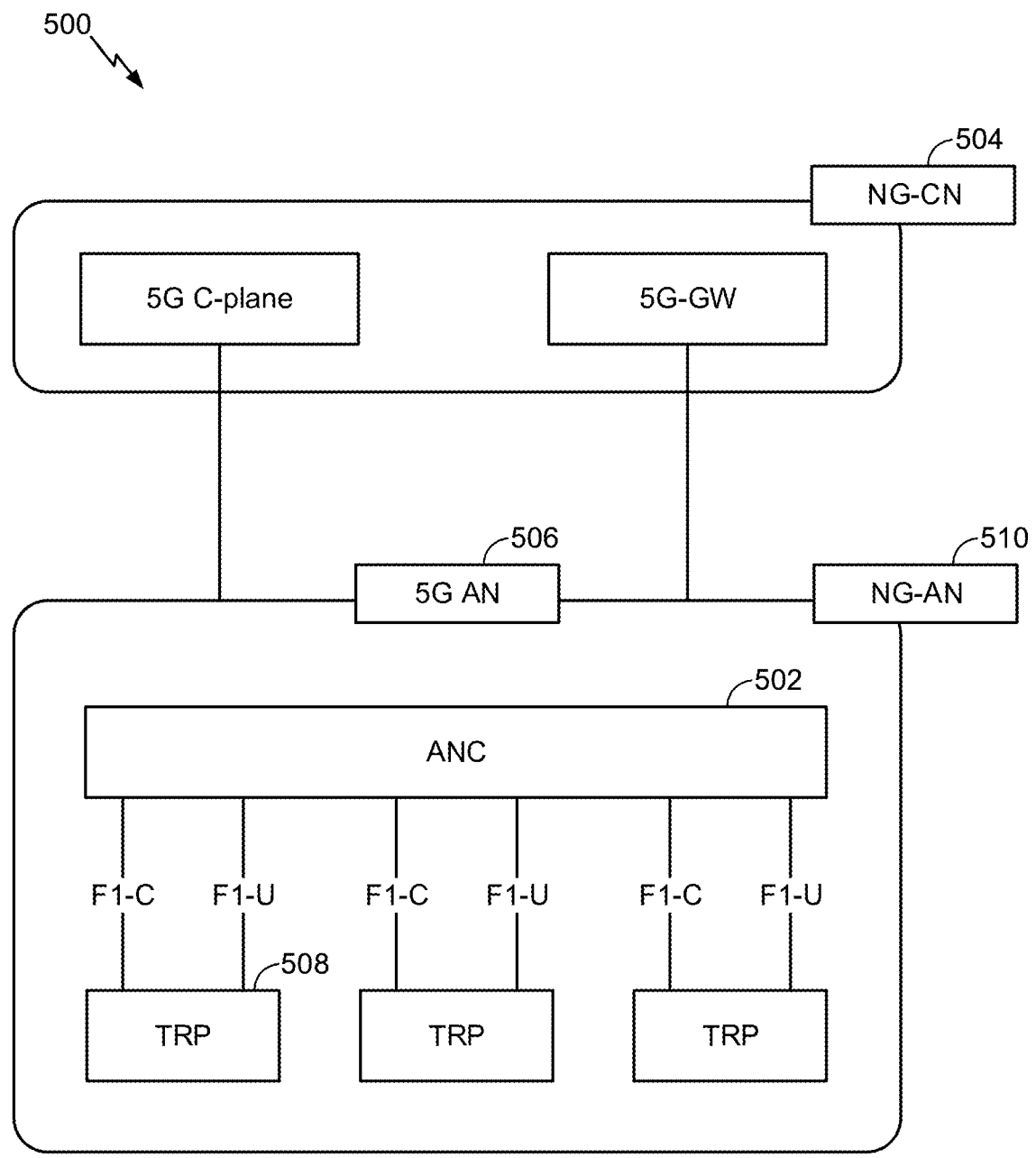
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, 5G BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with 5G. The NG-AN may share a common fronthaul for LTE and 5G.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508). Such BS may transmit wakeup signals to a UE, as described in more detail elsewhere herein.

As indicated above, FIG. 5 is provided merely as an example. Other examples are possible and may differ from what was described with regard to FIG. 5.

Figure 6:
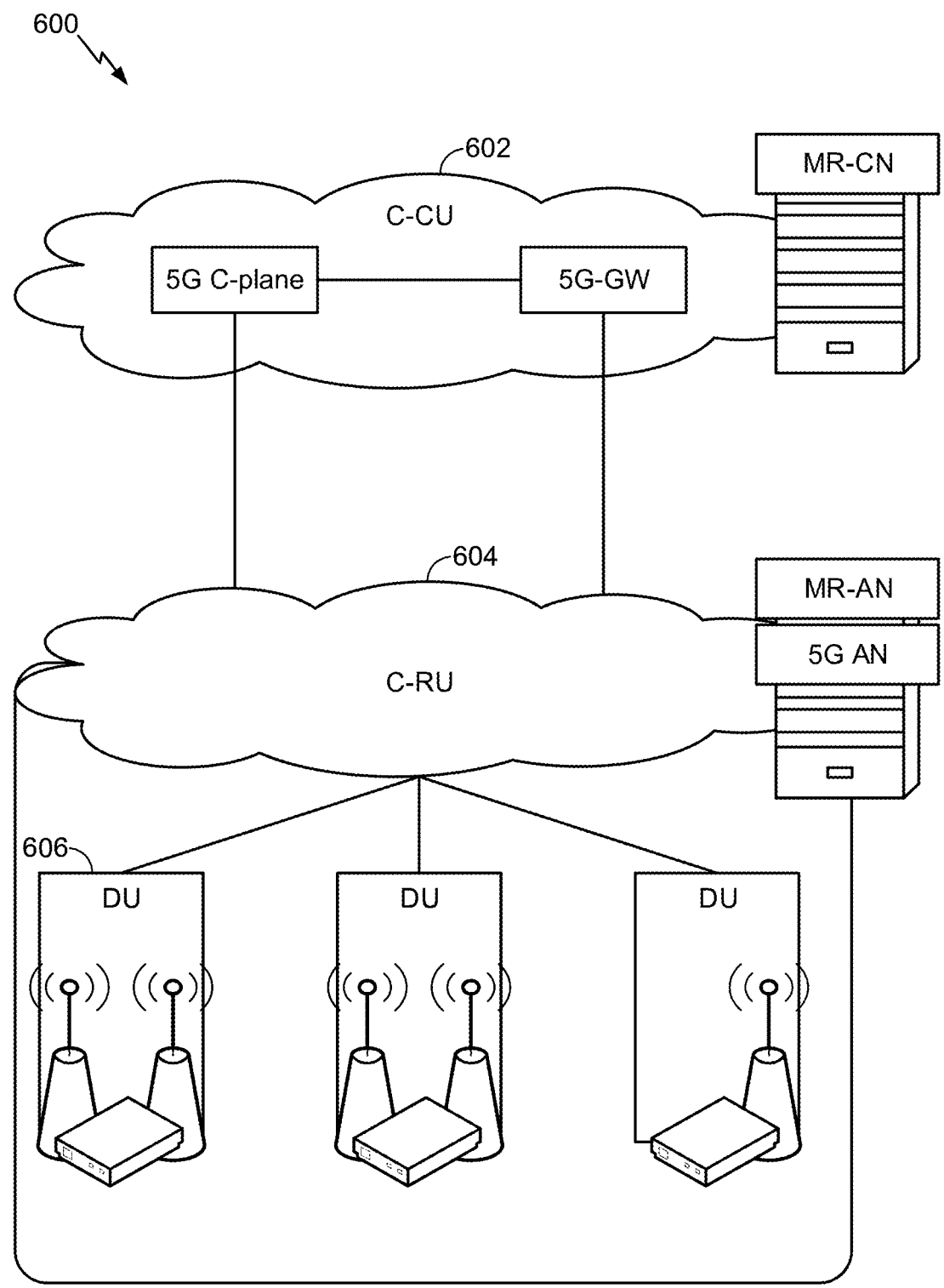
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions.

Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
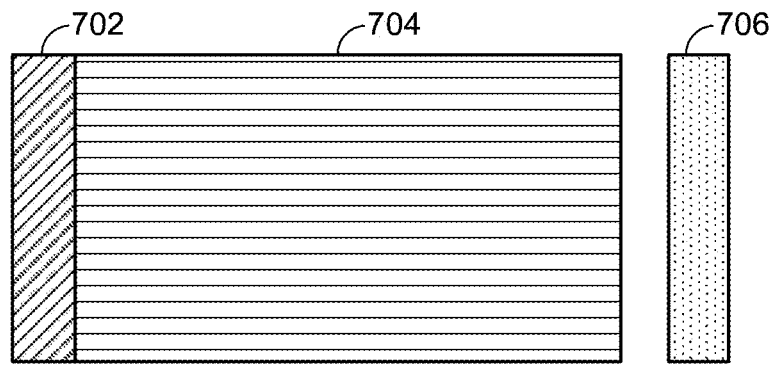
FIG. 7 is a diagram illustrating an example of a downlink (DL)-centric wireless communication structure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, a wakeup signal may indicate whether the PDCCH includes information relevant to a UE, and may be received prior to the PDCCH in time (e.g., in a previous subframe or earlier in the same subframe).

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
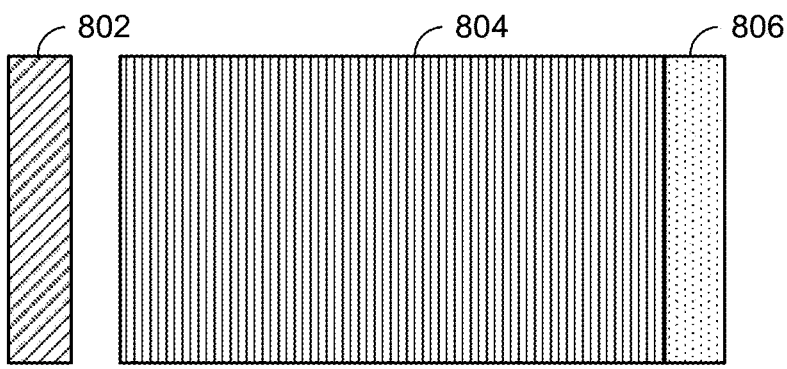
FIG. 8 is a diagram illustrating an example of an uplink (UL)-centric wireless communication structure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. In some configurations, the control portion 802 may be a physical DL control channel (PDCCH). In some aspects, a wakeup signal may indicate whether the PDCCH includes information relevant to a UE, and may be received prior to the PDCCH in time (e.g., in a previous subframe or earlier in the same subframe).

The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

When in an idle mode or a connected mode discontinuous reception (CDRX) mode, a UE may enter a low power state to conserve battery power, and may periodically wake up to monitor a control channel (e.g., the PDCCH and/or the like) for signals relating to the UE, such as pages. However, such control channel monitoring may be resource intensive and may consume battery power because the control channel uses complex signals that include a large amount of information. For example, the UE may wake up, search for signals on the control channel, decode the signals if the signals are found, and determine whether the decoded signals are relevant to the UE. If the decoded control channel signals are not relevant to the UE or no control channel signals are detected, then the battery power used to search for, receive, and decode the control channel signals is wasted.

Techniques described herein use a simple (e.g., one bit) wakeup signal to indicate to the UE whether an upcoming control channel signal resource includes information relevant to the UE. In this way, the UE wakes up to perform complex control channel signal processing only when the control channel includes signals relevant to the UE, thereby conserving battery power and resources of the UE. Such techniques are particularly suited to MTC UEs, NB-IoT UEs, and/or the like, which may communicate with a network only occasionally, and which may be located in remote locations where changing or recharging a battery is difficult.

Figure 9:
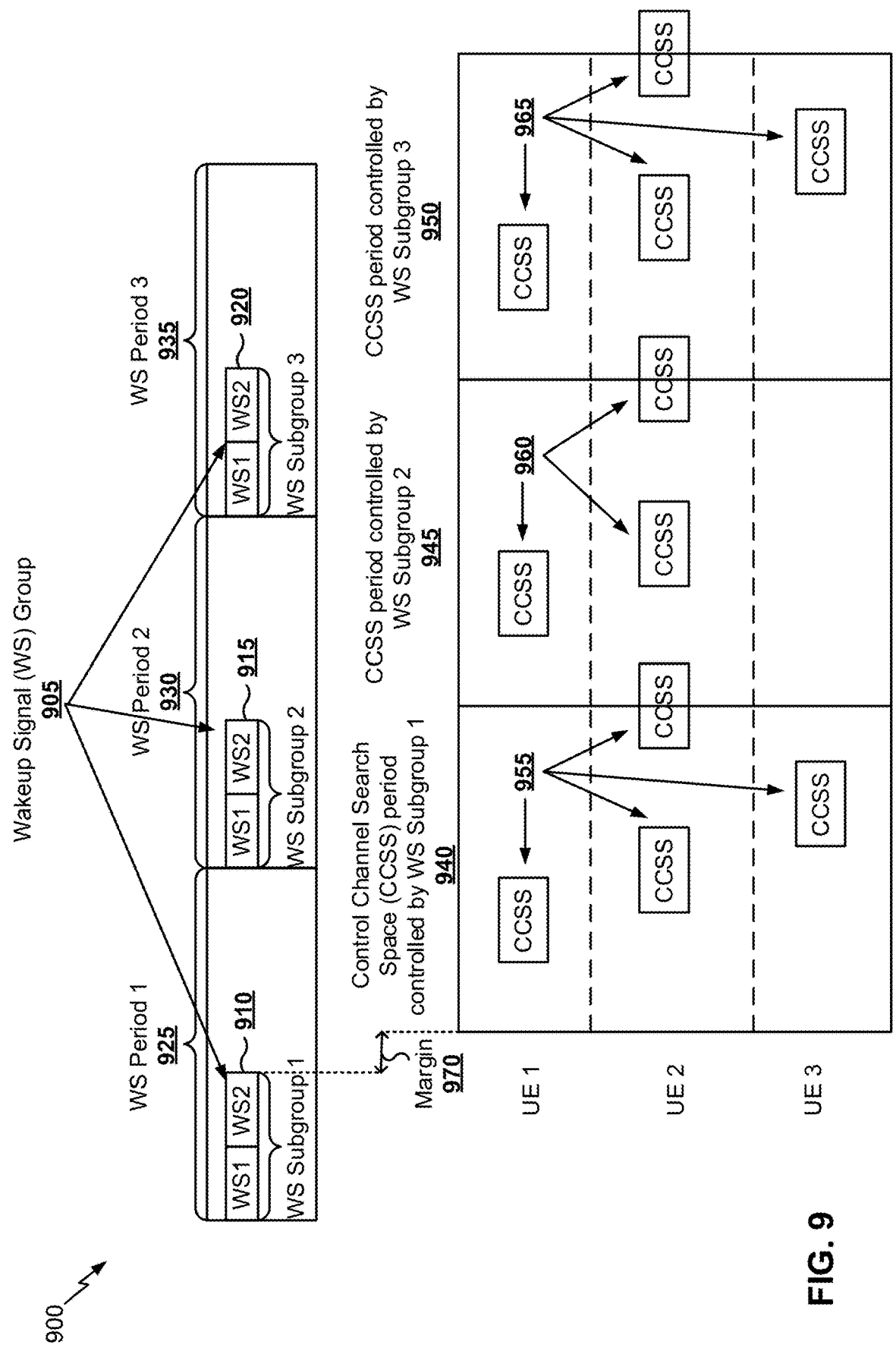
FIG. 9 is a diagram illustrating an example of control channel monitoring using a wakeup signal.

FIG. 9 is a diagram illustrating an example 900 of control channel monitoring using a wakeup signal. A wakeup signal may be communicated from a base station to a UE to indicate whether an upcoming control channel search space resource (e.g., a control channel resource in the time domain, the frequency domain, a code domain, and/or the like) will include information for the UE, such as a page, data, and/or the like. In some aspects, the UE may identify a wakeup signal resource associated with the UE based at least in part on a control channel search space resource associated with the UE. A wakeup signal resource may be defined in a time domain (e.g., using time division multiplexing), in a frequency domain (e.g., using frequency division multiplexing), in a code domain (e.g., using code division multiplexing, using a sequence), and/or the like. The wakeup signal resource may map to the control channel search space resource and may precede the control channel search space resource. In some aspects, the wakeup signal resource may be in a subframe (or slot) prior to a subframe (or slot) that includes the control channel search space resource. In some aspects, the wakeup signal resource may precede the control channel search space resource in a same subframe (or slot). In some aspects, a wakeup signal resource may map to one or more control channel search space resources (e.g., on one or more carriers, on one or more sets of subframes, and/or the like).

As shown in FIG. 9, a wakeup signal group 905 may include multiple wakeup signals in different resources (e.g., in the time domain, the frequency domain, the code domain, and/or the like). For example, the wakeup signal group 905 may include a first wakeup signal subgroup 910 (shown as WS Subgroup 1), a second wakeup signal subgroup 915 (shown as WS Subgroup 2), a third wakeup signal subgroup 920 (shown as WS Subgroup 3), and/or the like. A wakeup signal subgroup may include one or more wakeup signals (e.g., shown as a first wakeup signal WS1 and a second wakeup signal WS2). Additionally, or alternatively, the wakeup signal subgroups 910, 915, 920 included in the wakeup signal group 905 may be configured with a periodicity and/or time offset, shown as a first wakeup signal period 925 (e.g., WS Period 1), a second wakeup signal period 930 (e.g., WS Period 2), and a third wakeup signal period 935 (e.g., WS Period 3). In some aspects, different wakeup signal groups may be configured with different periodicities, time offsets, subgroup sizes (e.g., number of wakeup signals included in a subgroup), and/or the like. Although the wakeup signal subgroups are shown as being non-overlapping in time, in some aspects, a first wakeup signal subgroup may overlap in time with a second wakeup signal subgroup (e.g., a subsequent wakeup signal subgroup).

As further shown in FIG. 9, a first control channel search space (CCSS) period 940 may be controlled by the first wakeup signal subgroup 910, a second CCSS period 945 may be controlled by the second wakeup signal subgroup 915, and a third CCSS period 950 may be controlled by the third wakeup signal subgroup 920. When a CCSS resource begins in the first CCSS period 940, as shown by reference number 955, a UE associated with the CCSS resource may monitor a wakeup signal in the first wakeup signal subgroup 910 for an indication of whether the CCSS resource includes information relevant to the UE. For example, the UE may identify a CCSS resource associated with the UE (e.g., as shown by reference number 955), may identify a wakeup signal resource corresponding to the CCSS resource (e.g., the second wake up signal resource WS2 within the first wakeup signal subgroup 910), and may monitor the wakeup signal resource for an indication of whether to monitor the CCSS resource. The UE may selectively monitor the CCSS resource based at least in part on the indication. For example, the UE may initiate a wakeup procedure to monitor the CCSS resource when the indication indicates that the CCSS resource is to be monitored, or may sleep during the CCSS resource when the indication indicates that the CCSS resource is not to be monitored. In this way, the UE may skip monitoring of a CCSS resource when the CCSS resource does not include information relevant to the UE, thereby conserving battery power and UE resources.

As shown, a first UE (e.g., UE 1) may be associated with one CCSS resource in the first CCSS period 940. The first UE may monitor a wakeup signal in the first wakeup signal subgroup 910 to determine whether to monitor the CCSS resource. For example, the first UE may monitor at least one of WS1 or WS2 (e.g., depending on a configuration, as described below). As further shown, a second UE (e.g., UE 2) may be associated with two CCSS resources that begin in the first CCSS period 940. In some aspects, the second UE may monitor a first wakeup signal in the first wakeup signal subgroup 910 (e.g., WS1) to determine whether to monitor the first CCSS resource, and may monitor a second wakeup signal in the first wakeup signal subgroup 910 (e.g., WS2) to determine whether to monitor the second CCSS resource. In some aspects, the second UE may monitor a single wakeup signal (e.g., WS1) to determine whether to wake up for both the first CCSS resource and the second CCSS resource. For example, a single wakeup signal may correspond to multiple CCSS resources (e.g., indicated by a number of CCSS resources, a time period associated with one or more CCSS resources, and/or the like). In some aspects, the size of the wakeup signal subgroup may correspond to a maximum number of CCSS resources, associated with a single UE, that occur in a CCSS period. As further shown, a third UE (e.g., UE 3) is associated with one CCSS resource in the first CCSS period 940, and may monitor the first wakeup signal subgroup 910 in a similar manner as described in connection with the first UE.

When a CCSS resource begins in the second CCSS period 945, as shown by reference number 960, a UE associated with the CCSS resource may monitor a wakeup signal in the second wakeup signal subgroup 915 for an indication of whether the CCSS resource includes information relevant to the UE. For example, the first UE and the second UE may monitor the second wakeup signal subgroup 915 in a similar manner as described above in connection with the first wakeup signal subgroup 910. However, the third UE is not associated with any CCSS resources in the second CCSS period 945. In this case, the third UE may skip monitoring of the second wakeup signal subgroup 915, thereby further conserving battery power and UE resources. In some aspects, the UE(s) may receive indications from a base station that indicate the CCSS resources.

When a CCSS resource begins in the third CCSS period 950, as shown by reference number 965, a UE associated with the CCSS resource may monitor a wakeup signal in the third wakeup signal subgroup 920 for an indication of whether the CCSS resource includes information relevant to the UE. For example, the first UE, the second UE, and the third UE may monitor the third wakeup signal subgroup 920 in a similar manner as described above in connection with the first wakeup signal subgroup 910.

As shown by reference number 970, in some aspects, there may be a margin (e.g., a time margin) between the end of a wakeup signal subgroup and the beginning of a CCSS period and/or a first CCSS resource that occurs in the CCSS period. This margin may allow for sufficient time for the wakeup signal to be processed by one or more UEs prior to the occurrence of a CCSS resource associated with the one or more UEs.

As further shown in FIG. 9, in some aspects, the wakeup signal subgroup (e.g., a location of the wakeup signal subgroup) may occur before a corresponding CCSS location of a UE with no intervening wakeup signal subgroups associated with the UE. In this way, latency may be reduced and the UE and base station need not process data in advance as compared to using a wakeup signal subgroup that occurs a longer time before the CCSS resource.

In some aspects, a wakeup signal resource may map to multiple CCSS resources. In some aspects, the multiple CCSS resources may be associated with a single UE. For example, the first wakeup signal subgroup 910 may map to two CCSS resources associated with the second UE. Additionally, or alternatively, the multiple CCSS resources may be associated with multiple UEs. For example, the first wakeup signal subgroup 910 may map to one CCSS resource associated with the first UE, two CCSS resources associated with the second UE, and one CCSS resource associated with the third UE. In some aspects, a wakeup signal may be used to control monitoring of CCSS resources for multiple UEs, thereby conserving network resources as compared to using separate wakeup signals for each UE.

In some aspects, a UE may identify a wakeup signal resource corresponding to a CCSS resource based at least in part on a periodicity or a time offset associated with the wakeup signal resource. For example, the wakeup signal resource may have a time offset compared to a boundary of a CCSS period, a boundary of a CCSS resource, and/or the like. Furthermore, different wakeup signal resources may be separated in time according to a periodicity. In some aspects, the time offset and/or the periodicity may be signaled to the UE by a base station.

In some aspects, a UE may be mapped to a wakeup signal group (e.g., one or more wakeup signal resources) based at least in part on one or more factors. In this case, a base station may transmit multiple wakeup signals in different resources or groups, and may assign UEs to the different resources or groups based at least in part on the one or more factors. A factor may include, for example, a UE identifier associated with a UE, a radio network temporary identifier (RNTI) associated with control channel communications monitored by a UE, a signal-to-noise ratio (SINR) associated with a UE, a maximum repetition level associated with a UE, an actual repetition level associated with control channel communications for the UE, a carrier index associated with a CCSS resource associated with the UE, and/or the like. In some aspects, if a UE identifier is used to assign UEs to wakeup signal groups, the bits of the UE identifier used for the assignment may be different from the bits of the UE identifier used to assign UEs to paging groups (e.g., to receive pages). In this way, the wakeup signal resource may be different for different UEs that monitor the same paging resource, thereby reducing false paging wakeups. In some aspects, if the UE monitors multiple RNTIs for the PDCCH, and the wakeup signal resource depends on the RNTI, then the UE may monitor only one wakeup signal resource for all RNTIs monitored by the UE. In this case, the base station may send a wakeup signal resource corresponding to one RNTI, but may send the actual PDCCH using a different RNTI. Alternatively, the UE may monitor different wakeup signal resources for different RNTIs.

In some aspects, such mapping of UEs to wakeup signal groups may improve performance. For example, a first wakeup signal group may have a short periodicity, with wakeup signals being transmitted more often than a second wakeup signal group with a long periodicity. In this case, the base station may map UEs with low SINR (e.g., less than a threshold), a high repetition level for repeated communications (e.g., a maximum or actual repetition level that is greater than a threshold), and/or the like, to the first wakeup signal group. In this way, UEs associated with poor network conditions are more likely to receive a wakeup signal because of the lower periodicity. Conversely, the base station may map UEs with high SINR (e.g., greater than a threshold), a low repetition level for repeated communications (e.g., a maximum or actual repetition level that is less than a threshold), and/or the like, to the second wakeup signal group. In this way, UEs associated with good network conditions may conserve battery power and UE resources because of the higher periodicity.

In some aspects, the wakeup signal may be transmitted in a fixed resource, thereby reducing UE power needed to monitor the wakeup signal. In some aspects, the wakeup signal may be transmitted in multiple resources, and the UE may monitor the multiple resources, which may increase scheduling flexibility at the expense of UE power consumption. In some aspects, the wakeup signal may be transmitted using time diversity (e.g., by breaking the wakeup signal or multiple wakeup signals into multiple chunks transmitted with intervening time gaps). For example, the wakeup signal may be transmitted using space frequency block coding (SFBC), space time transmit diversity (STTD), beam sweeping, and/or the like. Additionally, or alternatively, the wakeup signal may be transmitted using frequency diversity (e.g., using frequency hopping for different wakeup signals).

As indicated above, FIG. 9 is provided as an example. Other examples are possible and may differ from what was described with respect to FIG. 9.

Figure 10:
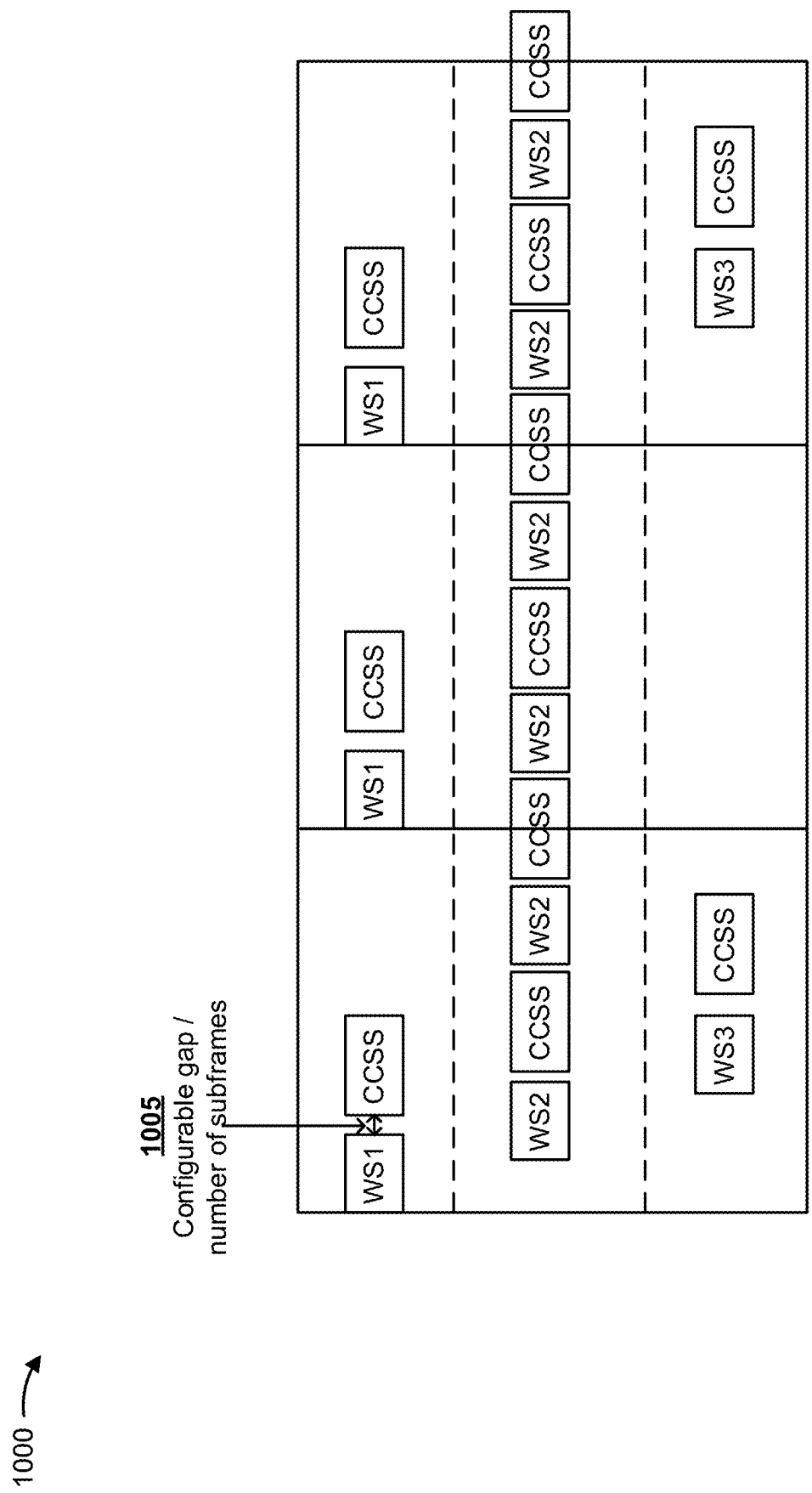
FIG. 10 is a diagram illustrating another example of control channel monitoring using a wakeup signal.

FIG. 10 is a diagram illustrating another example 1000 of control channel monitoring using a wakeup signal. As described above in connection with FIG. 9, a wakeup signal may be communicated from a base station to a UE to indicate whether an upcoming CCSS resource (e.g., a PDCCH search space resource) will include information for the UE, such as a page and/or the like. In some aspects, the UE may identify a wakeup signal resource associated with the UE based at least in part on a CCSS resource associated with the UE. The wakeup signal resource may map to the CCSS resource and may precede the control channel search space resource.

As shown by reference number 1005, in some aspects, a wakeup signal resource may occur at a preconfigured time period before a CCSS resource. The preconfigured time period may be, for example, a number of subframes (or slots) before the CCSS resource and/or the like. In this case, the UE may identify the wakeup signal resource based at least in part on a corresponding CCSS resource and the number of subframes. In some aspects, the base station may signal the preconfigured time period (e.g., the number of subframes) to the UE. Additionally, or alternatively, the preconfigured time period may be determined based at least in part on at least one of a SINR associated with the UE, a maximum repetition level of the control channel associated with the UE, an actual repetition level associated with control channel communications for the UE, and/or the like. For example, a UE associated with a low SINR and/or a high repetition level may be configured to use a larger number of subframes between the wakeup signal resource and the CCSS resource to provide an opportunity for wakeup signal repetition prior to the CCSS resource. Conversely, a UE associated with a high SINR and/or a low repetition level may be configured to use a smaller number of subframes between the wakeup signal resource and the CCSS resource because wakeup signal repetitions may not be necessary.

In some aspects, different UEs associated with a same CCSS resource may monitor different wakeup signals included in a wakeup signal subgroup that corresponds to the CCSS resource. For example, a first UE may monitor a first wakeup signal in the wakeup signal subgroup to determine whether to monitor the CCSS resource, and a second UE may monitor a second wakeup signal in the wakeup signal subgroup to determine whether to monitor the CCSS resource. In this way, network resources may be conserved by permitting multiple UEs to monitor the same wakeup signal subgroup, rather than using different wakeup signal subgroups for different UEs.

By using a wakeup signal resource that occurs a configurable number of subframes (or slots) before a corresponding CCSS resource, scheduling delay can be reduced. For example, a base station may be able to make scheduling decisions for communications closer in time to when the communications are actually sent, thereby improving utilization of network resources during scheduling.

In some aspects, the base station may signal a wakeup signal mode to the UE, and/or the base station and the UE may negotiate a wakeup signal mode. In some aspects, a first wakeup signal mode may use a wakeup signal subgroup to provide indications for CCSS resources included in a CCSS period, as described above in connection with FIG. 9. In some aspects, a second wakeup signal mode may use a wakeup signal prior to each CCSS resource, with no intervening CCSS resources, as described in connection with FIG. 10. In some aspects, the wakeup signal mode may be determined based at least in part on whether the wakeup signal is being used for paging, CDRX, a particular type of RNTI, and/or the like. In some aspects, both wakeup signal modes may be used together. For example, the first wakeup signal mode may be used for the first CCSS resource for a UE within a CCSS period, and the second wakeup signal mode may be used for additional CCSS resources for the UE within the CCSS period.

In some aspects, configuration information associated with wakeup signaling may be included in a master information block, a system information block, a unicast communication (e.g., in CDRX), and/or the like. The configuration information may include, for example, a periodicity, a number and/or configuration of wakeup signal groups, a number and/or configuration of wakeup signal subgroups, a margin, and/or the like.

In some aspects, the presence of a wakeup signal in a wakeup signal resource may indicate that a corresponding CCSS resource includes information relevant to a UE monitoring the wakeup signal. In this case, the UE may be configured to monitor the CCSS resource when a wakeup signal is present in the wakeup signal resource. Additionally, or alternatively, the absence of a wakeup signal in a wakeup signal resource may indicate that a corresponding CCSS resource does not include information relevant to a UE monitoring the wakeup signal. In this case, the UE may be configured to skip monitoring of the CCSS resource when a wakeup signal is absent from the wakeup signal resource. In this way, a base station may prevent transmission of a wakeup signal when a corresponding CCSS resource does not include information relevant to the UE, thereby conserving network resources. In some aspects, the base station may transmit multiple wakeup signals corresponding to different groups of UEs in a same time period, a same frequency, and/or the like. Alternatively, the presence of a wakeup signal in a wakeup signal resource may indicate that a corresponding CCSS resource does not include information relevant to a UE monitoring the wakeup signal, and the absence of a wakeup signal in a wakeup signal resource may indicate that a corresponding CCSS resource includes information relevant to a UE monitoring the wakeup signal.

In some aspects, a first bit value in the wakeup signal (e.g., 1) may indicate that the CCSS resource is to be monitored because the CCSS resource includes information relevant to the UE, and a second bit value in the wakeup signal (e.g., 0) may indicate that the CCSS resource is to be skipped because the CCSS resource does not include information relevant to the UE. In some aspects, a single bit may be used for the wakeup signal. In some aspects, multiple bits may be used for the wakeup signal. In some aspects, a payload size (e.g., a number of bits) of the wakeup signal may be less than a number of bits used for legacy downlink control information (DCI). For example, a legacy DCI payload (e.g., a PDCCH payload) may be 23 bits (e.g., for NB-IoT devices), and the payload size of the wakeup signal may be, for example, 1 bit, 2 bits, 3 bits, 4 bits, 5 bits, and/or the like. Since the number of resources (e.g. subframes) to be monitored to decode the PDCCH increase with the number of payload bits, using a smaller payload would help reduce the number of monitored resources. In this way, the UE may save power by monitoring fewer subframes or resource elements. In some aspects, DCI sent with the wakeup signal may be sent in a same search space as legacy DCI. In some aspects, DCI sent with the wakeup signal may be sent in an earlier search space than legacy DCI. In some aspects, DCI sent with the wakeup signal may be sent in a different search space than legacy DCI.

In some aspects, a value of the bit(s) may indicate a particular CCSS resource to be monitored when the wakeup signal corresponds to multiple CCSS resources. For example, a first value may indicate that the UE is to monitor only a first CCSS resource corresponding to the wakeup signal, a second value may indicate that the UE is to monitor only a second CCSS resource corresponding to the wakeup signal, a third value may indicate that the UE is to monitor both the first and second CCSS resources, a fourth value (or the absence of a wakeup signal) may indicate that the UE is to skip monitoring of all corresponding CCSS resources, and/or the like.

In some aspects, one or more payload bits of the wakeup signal may indicate at least one of whether to monitor a corresponding CCSS resource, one or more UEs (e.g., indicated by a UE identifier, a RNTI, and/or the like) that are to monitor the corresponding CCSS resource, one or more resources (e.g., a carrier, a search space, a subframe, a slot, a time resource, a frequency resource, and/or the like) where the control channel is enabled, one or more parameters to be used to decode the control channel (e.g., a bandwidth, a type of control channel, and/or the like), whether the UE is to transmit CSI feedback associated with monitoring the wakeup signal and/or the CCSS resource, and/or the like. In some aspects, the control channel may be a PDCCH, an eMTC PDCCH, an NB-IoT PDCCH, a legacy PDCCH, an ePDCCH, and/or the like.

In some aspects, the wakeup signal resource may correspond to a number of resource elements associated with a wakeup signal that is transmitted over a plurality of resource elements, and the number of resource elements over which a UE is configured to monitor for the wakeup signal is determined based at least in part on a maximum repetition level of control channel communications or a signal-to-noise ratio associated with the UE. For example, a wakeup signal may be sent over multiple subframes, and a UE may monitor a portion of the multiple subframes or all of the subframes. In some aspects, the number of subframes over which the wakeup signal is configured (e.g., the length of the wakeup signal) may be based at least in part on (e.g., equal to) a maximum repetition level for the control channel. In some aspects, a UE configured with the maximum repetition level supported by the system may monitor all of the subframes. In some aspects, a UE configured with a maximum control channel repetition level that is less than the maximum repetition level supported by the system may monitor less than all (e.g., a portion) of the subframes. In some aspects, the number of subframes and/or resource elements monitored by the UE may be a function of a maximum control channel repetition level associated with the UE and/or a SINR associated with the UE. In this way, the UE may conserve battery power and UE resources when in good network conditions, and may increase a likelihood of receiving the wakeup signal when in poor network conditions. Additionally, or alternatively, a UE may be configured to identify or monitor the wakeup signal resource based at least in part on a determination that the UE is associated with a repetition level or a signal-to-noise ratio that satisfies a condition. For example, wakeup signal monitoring may be enabled for a UE only when the UE is associated with poor network conditions.

In some aspects, a length of the wakeup signal (e.g., a number of resource elements, subframes, bits, and/or the like used for the wakeup signal) may be configured based at least in part on a maximum repetition level and/or an actual repetition level associated with the control channel, as described above. Additionally, or alternatively, the length of the wakeup signal may be configured based at least in part on whether the wakeup signal is transmitted using transmit diversity (TxD), whether the wakeup signal is transmitted using frequency hopping, a DRX cycle length associated with the UE and/or cell, and/or the like. For example, if the wakeup signal is transmitted using TxD, then the length of the wakeup signal (e.g., for a given SINR level) may be configured to be shorter than if the wakeup signal is not transmitted using TxD. Similarly, if the wakeup signal is transmitted using frequency hopping, then the length of the wakeup signal (e.g., for a given SINR level) may be configured to be shorter than if the wakeup signal is not transmitted using frequency hopping. In this way, the length of the wakeup signal may be shorter to conserve network resources when the UE has a greater likelihood of receiving the wakeup signal as a result of TxD and/or frequency hopping.

In some aspects, the wakeup signal may be configured to have a longer length for a longer DRX cycle (e.g., greater than or equal to a threshold), and may be configured to have a shorter length for a shorter DRX cycle. As the length of the DRX cycle increases, the likelihood of a timing and/or frequency error increases, and so the wakeup signal may be configured with a longer length to increase the likelihood of reception of the wakeup signal by the UE. Additionally, or alternatively, the length of the wakeup signal may be explicitly configured (e.g., signaled) via a radio resource control (RRC) configuration message.

In some aspects, to reduce a time duration of the wakeup signal and enable a UE sleep mode (e.g., micro sleep), the wakeup signal may be transmitted using a higher bandwidth (e.g., a maximum possible bandwidth or a power level corresponding to the maximum possible bandwidth). For example, for NB-IoT, the wakeup signal may be transmitted using a full one resource block; for eMTC, the wakeup signal may be transmitted using a full six resource blocks; and/or the like. Additionally, or alternatively, the wakeup signal may be transmitted with power boosting by using power of unused resource element(s) in symbol(s) in which the wakeup signal is transmitted, thus decreasing the bandwidth that the UE needs to monitor. For example, for NB-IoT, the wakeup signal may be transmitted in two tones, but may use the power of the entire resource block so that the UE would effectively achieve the performance as 12 resource elements, but will only monitor 2 resource elements. Additionally, or alternatively, the bandwidth used for the wakeup signal (e.g., a number of resource elements in the frequency domain) may be configurable. In some aspects, wakeup signal transmission may be configured to minimize a number of symbols for transmission before reducing a number of frequencies used for transmission.

In some aspects, the UE may transmit an acknowledgement indication (ACK) in response to detecting the wakeup signal. In this way, the base station may conserve resources by avoiding transmission on the PDCCH when an ACK is not received. In some aspects, the base station may rely on the ACK for the corresponding PDCCH communication. In some aspects, the base station may transmit multiple wakeup signals (e.g., in a DRX on duration, a paging occasion, and/or the like), and the UE may ACK the multiple wakeup signals. In some aspects, if the ACK if used in response to the PDCCH communication, the base station may retransmit the wakeup signal and the corresponding PDCCH communication if the ACK is not received. In this case, a DRX on duration may be increased to account for the multiple transmissions. In some aspects, the UE may sleep between consecutive wakeup signals and/or corresponding PDCCH communications to achieve power savings.

In some aspects, for NB-IoT, a wakeup signal may be sent on a different carrier than the PDCCH communication. Additionally, or alternatively, one wakeup signal resource may correspond to multiple PDCCH carriers, subframes, search spaces, and/or the like. In some aspects, the subframes used for the wakeup signal on an NB-IoT carrier may be the same subframes as those determined to be available for PDCCH and/or PDSCH communications on that carrier. In some aspects, an independent valid subframe configuration (e.g., a bitmap) may be signaled for the wakeup signal resource on the NB-IoT carrier. In some aspects, the wakeup signal may be sent in a PDSCH region, and may occupy the entire subframe (e.g., for standalone band and/or guard band), or may occupy only a non-control portion of the subframe (e.g., for in-band). Alternatively, the wakeup signal may occupy the entire subframe for the standalone and/or guard band. In some aspects, a narrowband reference signal (NRS) may be present, and the wakeup signal may be rate matched and/or punctured around the NRS. In some aspects, the UE may assume the presence of NRS. In some aspects, the UE may assume the absence of NRS. In some aspects, the UE may receive an indication of whether NRS is present or absent in a wakeup signal resource (e.g., a same subframe as a wakeup signal), and may decode the wakeup signal based at least in part on the indication. Additionally, or alternatively, the UE may determine whether the NRS is present or absent on a carrier based at least in part on whether the carrier is an anchor carrier or a non-anchor carrier.

In some aspects, the UE may apply adaptive receive diversity (RxD) to reception of the wakeup signal and/or the corresponding PDCCH communication. For example, the UE may monitor the wakeup signal without RxD, and may monitor the corresponding PDCCH with RxD (e.g., to conserve power when monitoring the wakeup signal). Additionally, or alternatively, the UE may modify one or more parameters to enable or disable RxD (e.g., after a number of received wakeup signals, after a number of received PDCCH communications, after a number of paging occasions, after a number of PDCCH monitoring occasions, and/or the like) based at least in part on whether a communication to be received is a wakeup signal, a corresponding PDCCH, and/or the like.

In some aspects, for a 20 MHz bandwidth, a 5 MHz PDCCH control region may be defined in the PDSCH so the UE can monitor a smaller bandwidth. In some aspects, multiple such 5 MHz legacy PDCCH regions may be defined. In this case, legacy PDCCH multiplexing may be reused to enable reuse of UE hardware and/or the like. For example, a first set of OFDM symbols may correspond to a first PDCCH control region that a UE will monitor, a second set of OFDM symbols may correspond to a second PDCCH control region for a different subframe, a different UE identifier, and/or the like.

As indicated above, FIG. 10 is provided as an example. Other examples are possible and may differ from what was described with respect to FIG. 10.

Figure 11:
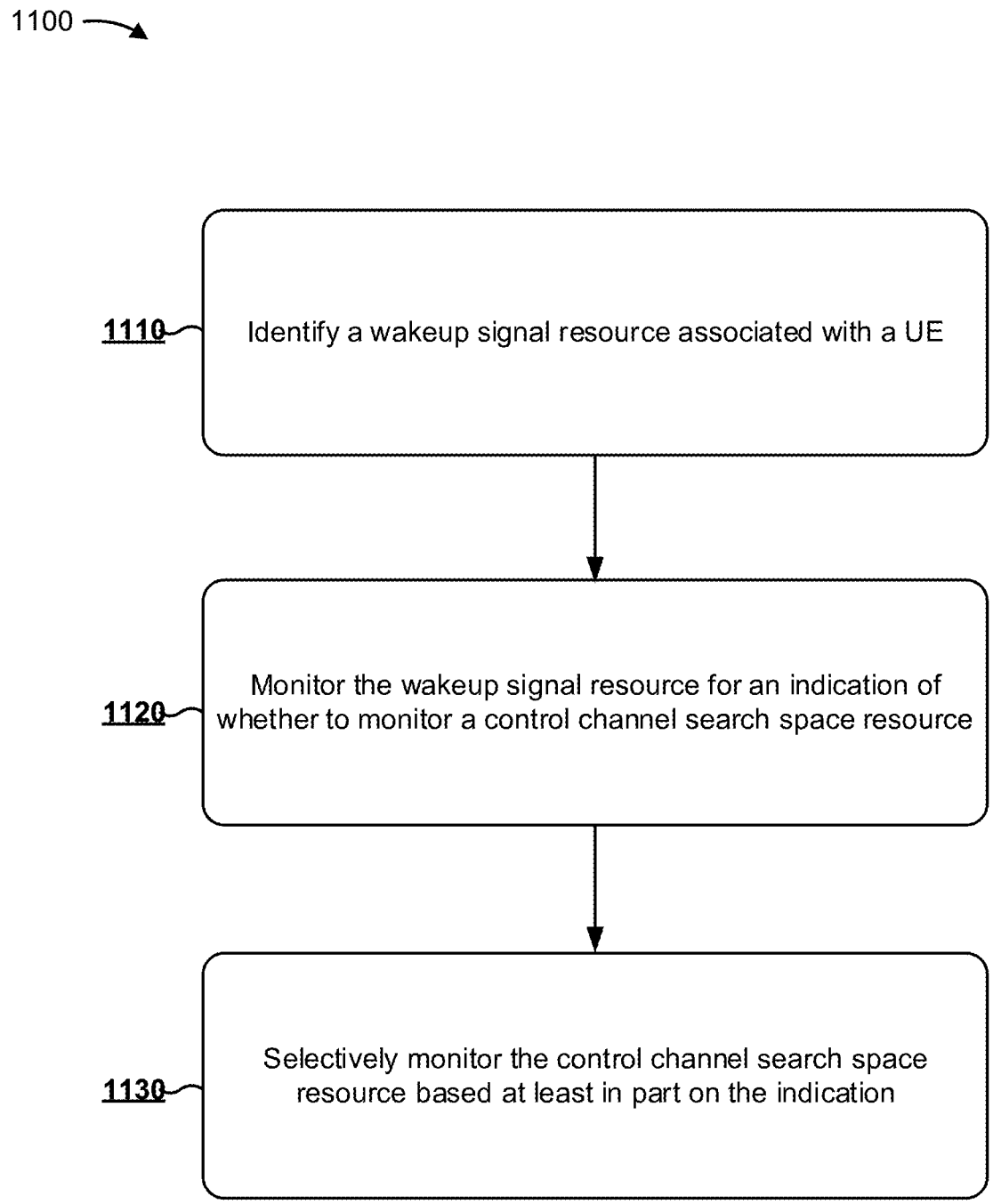
FIG. 11 is a flow chart of a method of wireless communication.

FIG. 11 is a flow chart of a method 1100 of wireless communication. The method may be performed by a UE (e.g., the UE 120 of FIG. 1, one or more UEs described in connection with FIG. 9 and/or FIG. 10, the apparatus 1302 of FIG. 13, the apparatus 1302' of FIG. 14, and/or the like).

At 1110, the UE may identify a wakeup signal resource associated with the UE. For example, the UE may identify a wakeup signal resource associated with the UE based at least in part on a control channel search space resource associated with the UE, as described above in connection with FIGS. 9 and 10. The wakeup signal resource may map to the control channel search space resource and may precede the control channel search space resource (e.g., in time).

In some aspects, the wakeup signal resource maps to a plurality of control channel search space resources. In some aspects, the plurality of control channel search space resources are associated with the UE. In some aspects, the plurality of control channel search space resources are associated with a plurality of UEs. In some aspects, a wakeup signal in the wakeup signal resource indicates one or more UEs that are to monitor the control channel search space resource. In some aspects, the wakeup signal resource is different for different UEs monitoring the same paging resource.

In some aspects, the wakeup signal resource is identified based at least in part on a periodicity or a time offset associated with the wakeup signal resource. In some aspects, the wakeup signal resource is identified based at least in part on at least one of: a UE identifier associated with the UE, a radio network temporary identifier (RNTI) associated with control channel communications monitored by the UE, a signal-to-noise ratio associated with the UE, a maximum repetition level associated with the UE, an actual repetition level associated with control channel communications for the UE, a carrier index associated with the control channel search space resource, or some combination thereof.

In some aspects, the wakeup signal resource occurs before the control channel search space resource with no intervening wakeup signal resources associated with the UE. In some aspects, the wakeup signal resource occurs a number of subframes before the control channel search space resource. In some aspects, the number of subframes is identified based at least in part on at least one of: a signal-to-noise ratio associated with the UE, a maximum repetition level associated with the UE, an actual repetition level associated with control channel communications for the UE, or some combination thereof.

In some aspects, the UE is configured to identify or monitor the wakeup signal resource based at least in part on a determination that the UE is associated with a repetition level or a signal-to-noise ratio that satisfies a condition.

At 1120, the UE may monitor the wakeup signal resource for an indication of whether to monitor the control channel search space resource. For example, the UE may monitor the wakeup signal resource, which may indicate whether to monitor the control channel search space resource, as described above in connection with FIGS. 9 and 10.

In some aspects, the UE is configured to monitor the control channel search space resource when a wakeup signal is present in the wakeup signal resource. Additionally, or alternatively, the UE is configured to skip monitoring of the control channel search space resource when the wakeup signal is absent from the wakeup signal resource. In some aspects, the UE is configured to identify or monitor the wakeup signal resource based at least in part on a determination that the UE is associated with a repetition level or a signal-to-noise ratio that satisfies a condition.

In some aspects, the wakeup signal resource corresponds to a number of resource elements associated with a wakeup signal that is transmitted over a plurality of resource elements. In some aspects, the number of resource elements over which the UE is configured to monitor for the wakeup signal is determined based at least in part on a maximum repetition level of control channel communications or a signal-to-noise ratio associated with the UE. In some aspects, a length of the wakeup signal is configured based at least in part on at least one of: a maximum repetition level associated with a control channel that includes the control channel search space resource, an actual repetition level associated with the control channel, a determination of whether the wakeup signal is transmitted using transmit diversity, a determination of whether the wakeup signal is transmitted using frequency hopping, a discontinuous reception cycle length associated with the UE, a radio resource control (RRC) configuration message, or some combination thereof. In some aspects, a payload size of a wakeup signal in the wakeup signal resource is less than a payload size used for legacy downlink control information in a control channel that includes the control channel search space resource, wherein the wakeup signal is also carried on a physical downlink control channel (PDCCH).

In some aspects, the wakeup signal resource is identified or monitored based at least in part on a wakeup signal mode determined based at least in part on whether a wakeup signal is being used for connected mode discontinuous reception (CDRX)

At 1130, the UE may selectively monitor the control channel search space resource based at least in part on the indication. For example, the UE may selectively monitor (e.g., may monitor or skip monitoring) the control channel search space resource based at least in part on the indication, in the wakeup signal resource, of whether to monitor the control channel search space resource, as described above in connection with FIGS. 9 and 10.

In some aspects, the UE is configured to initiate a wakeup procedure to monitor the control channel search space resource when the monitoring of the wakeup signal resource indicates that the control channel search space resource is to be monitored. Additionally, or alternatively, the UE is configured to sleep during the control channel search space resource when the monitoring of the wakeup signal resource indicates that the control channel search space resource is not to be monitored.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
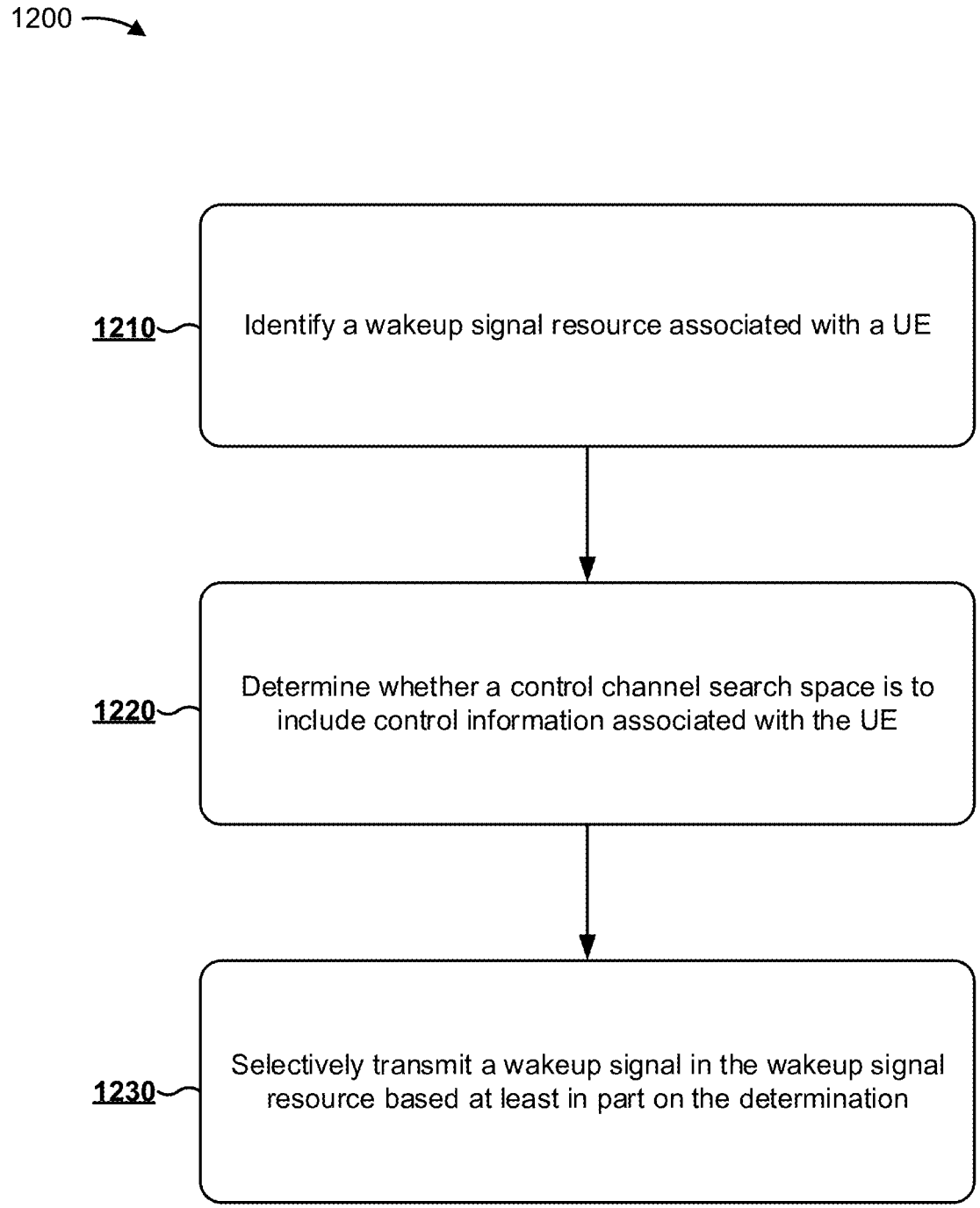
FIG. 12 is a flow chart of another method of wireless communication.

FIG. 12 is a flow chart of a method 1200 of wireless communication. The method may be performed by a base station (e.g., the base station 110 of FIG. 1, one or more base stations described in connection with FIG. 9 and/or FIG. 10, the apparatus 1502 of FIG. 15, the apparatus 1502' of FIG. 16, and/or the like).

At 1210, the base station may identify a wakeup signal resource associated with a UE. For example, the base station may identify a wakeup signal resource associated with a UE based at least in part on a control channel search space resource associated with the UE, as described above in connection with FIGS. 9 and 10. The wakeup signal resource may map to the control channel search space resource, and may precede the control channel search space resource.

In some aspects, the wakeup signal resource maps to a plurality of control channel search space resources. In some aspects, the plurality of control channel search space resources are associated with the UE. In some aspects, the plurality of control channel search space resources are associated with a plurality of UEs.

In some aspects, the wakeup signal resource is identified based at least in part on a periodicity or a time offset associated with the wakeup signal resource and indicated to the UE. In some aspects, the wakeup signal resource is identified based at least in part on at least one of: a UE identifier associated with the UE, a radio network temporary identifier (RNTI) associated with control channel communications monitored by the UE, a signal-to-noise ratio associated with the UE, a maximum repetition level associated with the UE, an actual repetition level associated with control channel communications for the UE, a carrier index associated with the control channel search space resource, or some combination thereof.

In some aspects, the wakeup signal resource occurs before the control channel search space resource with no intervening wakeup signal resources associated with the UE. In some aspects, the wakeup signal resource occurs a number of subframes before the control channel search space resource. In some aspects, the number of subframes is identified based at least in part on at least one of: a signal-to-noise ratio associated with the UE, a maximum repetition level associated with the UE, an actual repetition level associated with control channel communications for the UE, or some combination thereof.

At 1220, the base station may determine whether a control channel search space is to include control information associated with the UE. For example, the base station may determine whether a control channel search space is to include control information associated with the UE, as described above in connection with FIGS. 9 and 10. The control channel search space may be associated with a control channel search space resource.

At 1230, the base station may selectively transmit a wakeup signal in the wakeup signal resource based at least in part on determining whether the control channel search space includes control information associated with the UE. For example, the base station may selectively transmit a wakeup signal in the wakeup signal resource based at least in part on determining whether the control channel search space is to include control information associated with the UE, as described above in connection with FIGS. 9 and 10. In some aspects, the wakeup signal indicates whether the UE is to initiate a wakeup procedure to monitor the control channel search space resource or sleep during the control channel search space resource. In some aspects, the wakeup signal indicates one or more UEs that are to monitor the control channel search space resource.

In some aspects, the base station is configured to transmit the wakeup signal when the control channel search space includes control information associated with the UE. Additionally, or alternatively, the base station is configured to skip transmission of the wakeup signal when the control channel search space does not include control information associated with the UE.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
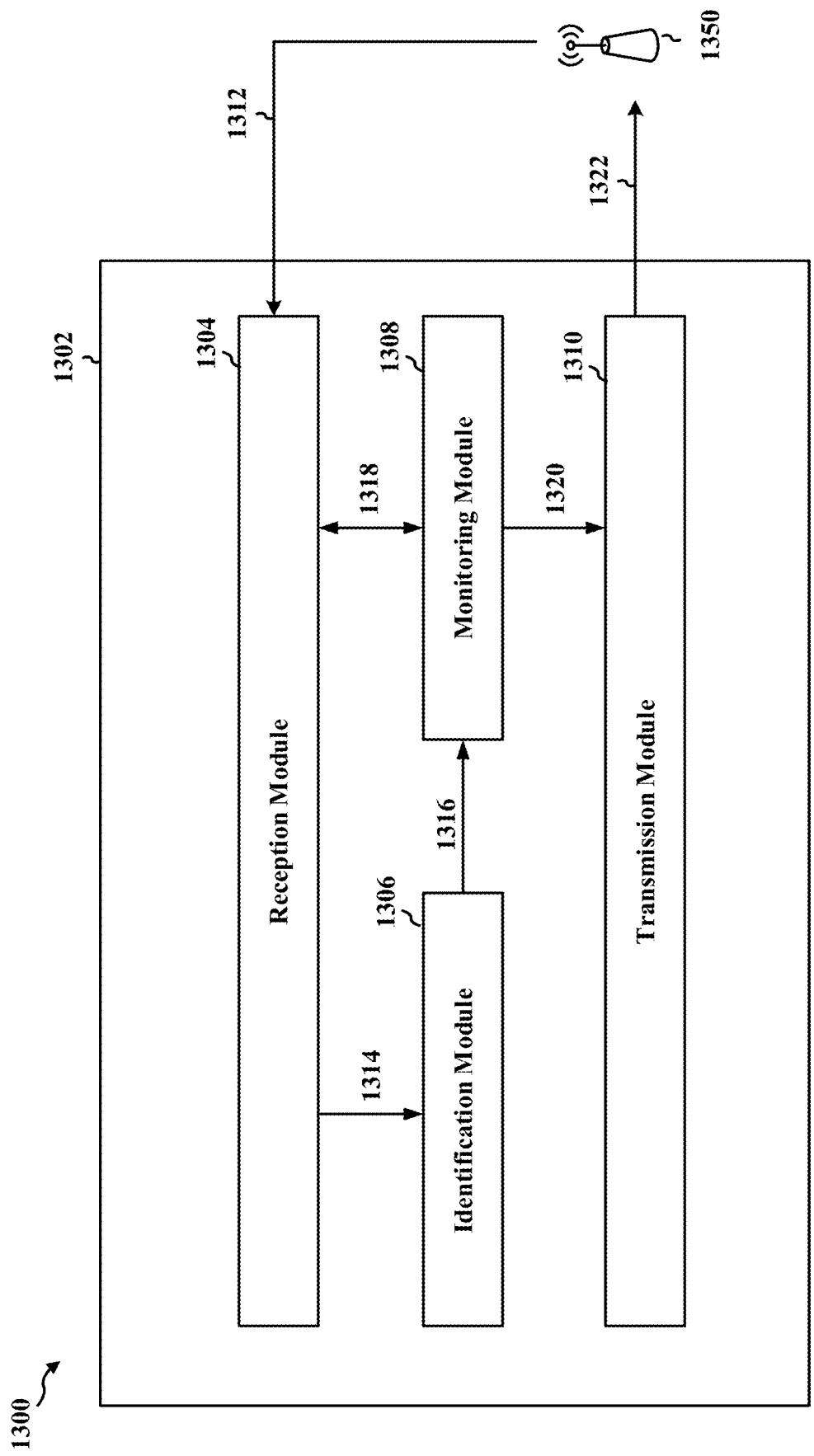
FIG. 13 is a conceptual data flow diagram illustrating the data flow between different modules/means/components in an example apparatus.

FIG. 13 is a conceptual data flow diagram 1300 illustrating the data flow between different modules/means/components in an example apparatus 1302. The apparatus 1302 may be a UE. In some aspects, the apparatus 1302 includes a reception module 1304, an identification module 1306, a monitoring module 1308, and/or a transmission module 1310.

The reception module 1304 may receive, as data 1312 from a base station 1350, information that identifies a control channel search space resource associated with the apparatus 1302. The reception module 1304 may provide the information that identifies the control channel search space resource to the identification module 1306 as data 1314. The identification module 1306 may identify a wakeup signal resource associated with the apparatus 1302 based at least in part on a control channel search space resource associated with the apparatus 1302. The identification module 1306 may provide information that identifies the wakeup signal resource to the monitoring module 1308 as data 1316.

The monitoring module 1308 may monitor the wakeup signal resource for an indication of whether to monitor the control channel search space resource. In some aspects, the monitoring module 1308 and the reception module 1304 may communicate using data 1318. For example, the monitoring module 1308 may provide an indication of the wakeup signal resource as data 1318, and the reception module 1304 may monitor the wakeup signal resource. The reception module 1304 may provide an indication, based at least in part on monitoring the wakeup signal resource, to the monitoring module 1308 as data 1318. The monitoring module 1308 may interpret the indication to determine whether to monitor the control channel search space resource, and may selectively monitor the control channel search space resource based at least in part on the indication of whether to monitor the control channel search space resource. For example, the monitoring module 1308 may provide an indication of whether to monitor the control channel search space resource to the reception module 1304 as data 1318. The reception module 1304 may selectively monitor the control channel search space resource based at least in part on the indication.

In some aspects, one or more modules 1304, 1306, 1308 may provide data 1320 to the transmission module 1310, and the transmission module 1310 may provide data 1322 to the base station 1350. For example, the transmission module 1310 may transmit data 1322 to the base station 1350 based at least in part on the apparatus 1302 monitoring the control channel search space resource (e.g., when the control channel search space resource include control information instructing the apparatus 1302 to transmit data 1322 to the base station 1350.

The apparatus may include additional modules that perform each of the blocks of the algorithm in the aforementioned flow chart of FIG. 11. As such, each block in the aforementioned flow chart of FIG. 11 may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 13 are provided as an example. In practice, there may be additional modules, fewer modules, different modules, or differently arranged modules than those shown in FIG. 13. Furthermore, two or more modules shown in FIG. 13 may be implemented within a single module, or a single module shown in FIG. 13 may be implemented as multiple, distributed modules. Additionally, or alternatively, a set of modules (e.g., one or more modules) shown in FIG. 13 may perform one or more functions described as being performed by another set of modules shown in FIG. 13.

Figure 14:
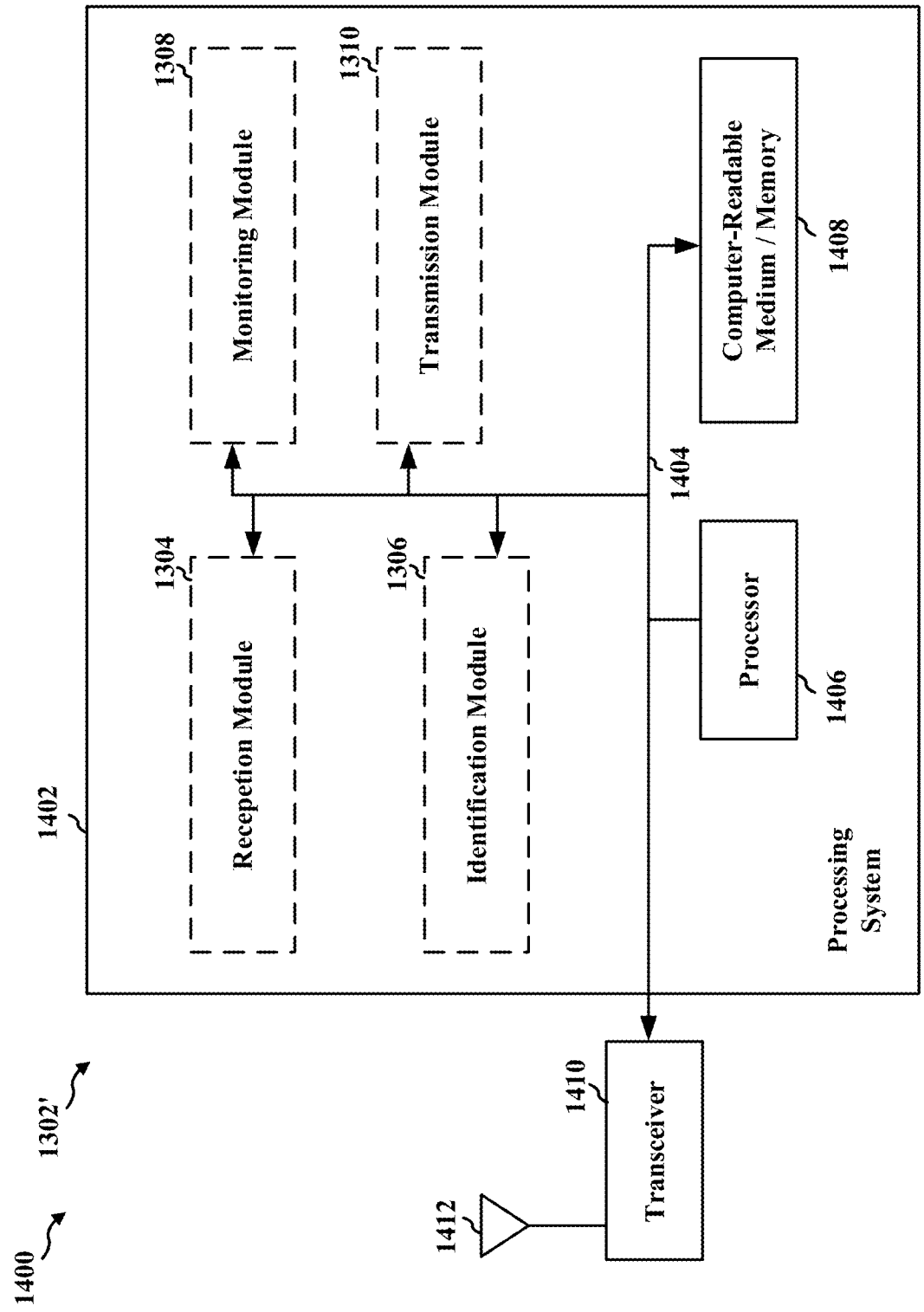
FIG. 14 is a diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be a UE.

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware modules, represented by the processor 1406, the modules 1304, 1306, 1308, and/or 1310, and the computer-readable medium/memory 1408. The bus 1404 may also link various other circuits such as timing sources, peripherals, voltage regulators, and power management circuits, which are well known in the art, and therefore, will not be described any further.

The processing system 1402 may be coupled to a transceiver 1410. The transceiver 1410 is coupled to one or more antennas 1412. The transceiver 1410 provides a means for communicating with various other apparatus over a transmission medium. The transceiver 1410 receives a signal from the one or more antennas 1412, extracts information from the received signal, and provides the extracted information to the processing system 1402, specifically the reception module 1304. In addition, the transceiver 1410 receives information from the processing system 1402, specifically the transmission module 1310, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/ memory 1408. The software, when executed by the processor 1406, causes the processing system 1402 to perform the various functions described supra for any particular apparatus. The computer-readable medium/memory 1408 may also be used for storing data that is manipulated by the processor 1406 when executing software. The processing system further includes at least one of the modules 1304, 1306, 1308, and/or 1310. The modules may be software modules running in the processor 1406, resident/stored in the computer readable medium/memory 1408, one or more hardware modules coupled to the processor 1406, or some combination thereof. The processing system 1402 may be a component of the UE 120 and may include the memory 282 and/or at least one of the TX MIMO processor 266, the RX processor 258, and/or the controller/processor 280.

In some aspects, the apparatus 1302/1302' for wireless communication includes means for identifying a wakeup signal resource associated with the UE, means for monitoring the wakeup signal resource, means for selectively monitoring the control channel search space resource, and/or the like. The aforementioned means may be one or more of the aforementioned modules of the apparatus 1302 and/or the processing system 1402 of the apparatus 1302' configured to perform the functions recited by the aforementioned means. As described supra, the processing system 1402 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 14 is provided as an example. Other examples are possible and may differ from what was described in connection with FIG. 14.

Figure 15:
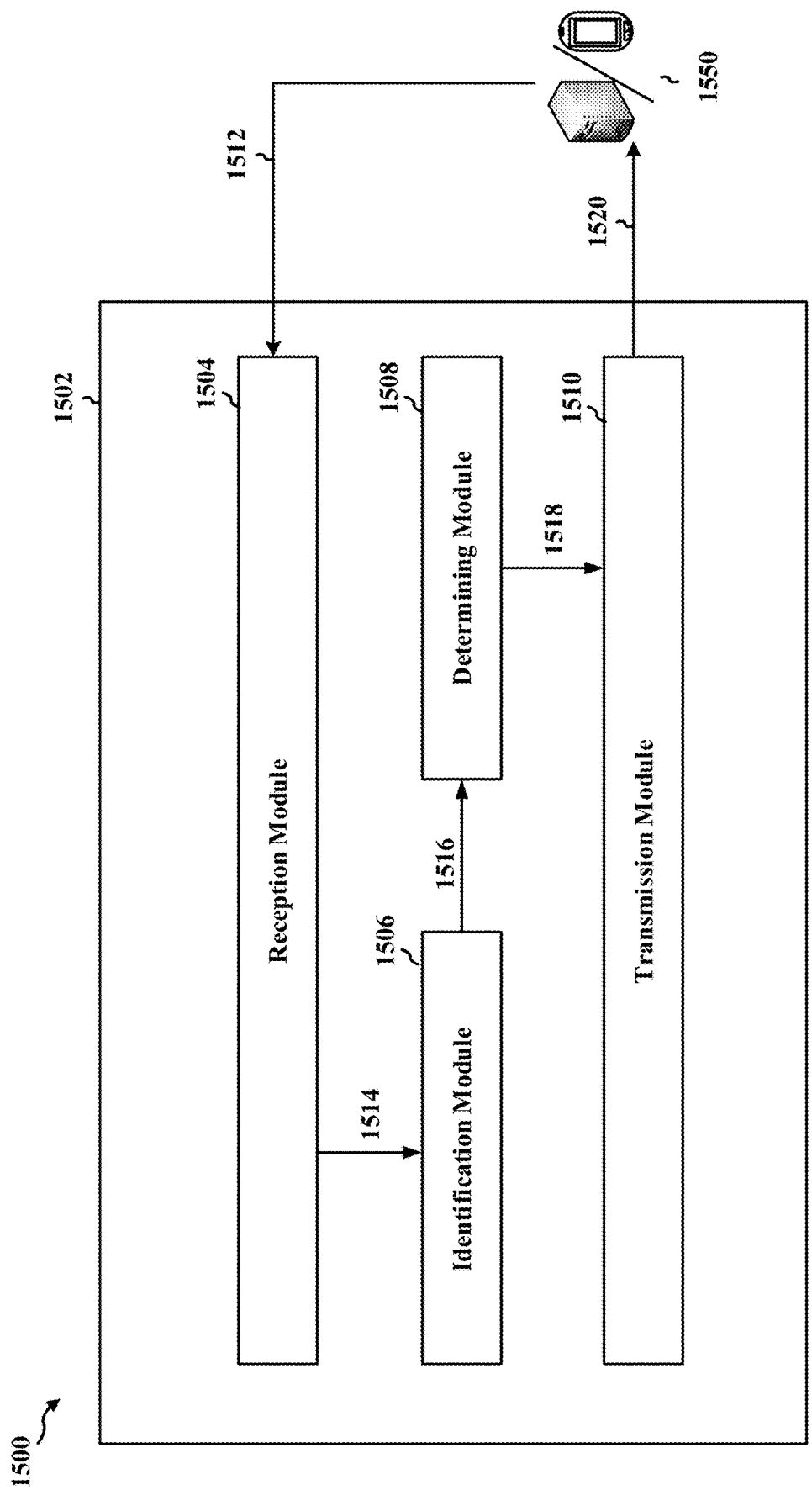
FIG. 15 is a conceptual data flow diagram illustrating the data flow between different modules/means/components in another example apparatus.

FIG. 15 is a conceptual data flow diagram 1500 illustrating the data flow between different modules/means/components in an example apparatus 1502. The apparatus 1502 may be a base station. In some aspects, the apparatus 1502 includes a reception module 1504, an identification module 1506, a determining module 1508, and/or a transmission module 1510.

The reception module 1504 may receive data 1512 from a device 1550, such as a UE or a network device. For example, the reception module 1504 may receive information, associated with the UE, to be used to identify a wakeup signal resource associated with the UE (e.g., a UE identifier and/or the like). The reception module 1504 may provide such information to the identification module 1506 as data 1514. The identification module 1506 may identify a wakeup signal resource associated with a UE based at least in part on a control channel search space resource associated with the UE (e.g., determined based at least in part on the information associated with the UE). The identification module 1506 may provide information that identifies the control channel search space resource to the determining module 1508 as data 1516.

The determining module 1508 may determine whether a control channel search space, associated with the control channel search space resource, includes control information associated with the UE. The determining module 1508 may provide an indication of whether the control channel search space includes the control information to the transmission module 1510 as data 1518. The transmission module 1510 may selectively transmit, to the UE as data 1520, a wakeup signal in the wakeup signal resource based at least in part on determining whether the control channel search space includes control information associated with the UE.

The apparatus may include additional modules that perform each of the blocks of the algorithm in the aforementioned flow chart of FIG. 12. As such, each block in the aforementioned flow chart of FIG. 12 may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 15 are provided as an example. In practice, there may be additional modules, fewer modules, different modules, or differently arranged modules than those shown in FIG. 15. Furthermore, two or more modules shown in FIG. 15 may be implemented within a single module, or a single module shown in FIG. 15 may be implemented as multiple, distributed modules. Additionally, or alternatively, a set of modules (e.g., one or more modules) shown in FIG. 15 may perform one or more functions described as being performed by another set of modules shown in FIG. 15.

Figure 16:
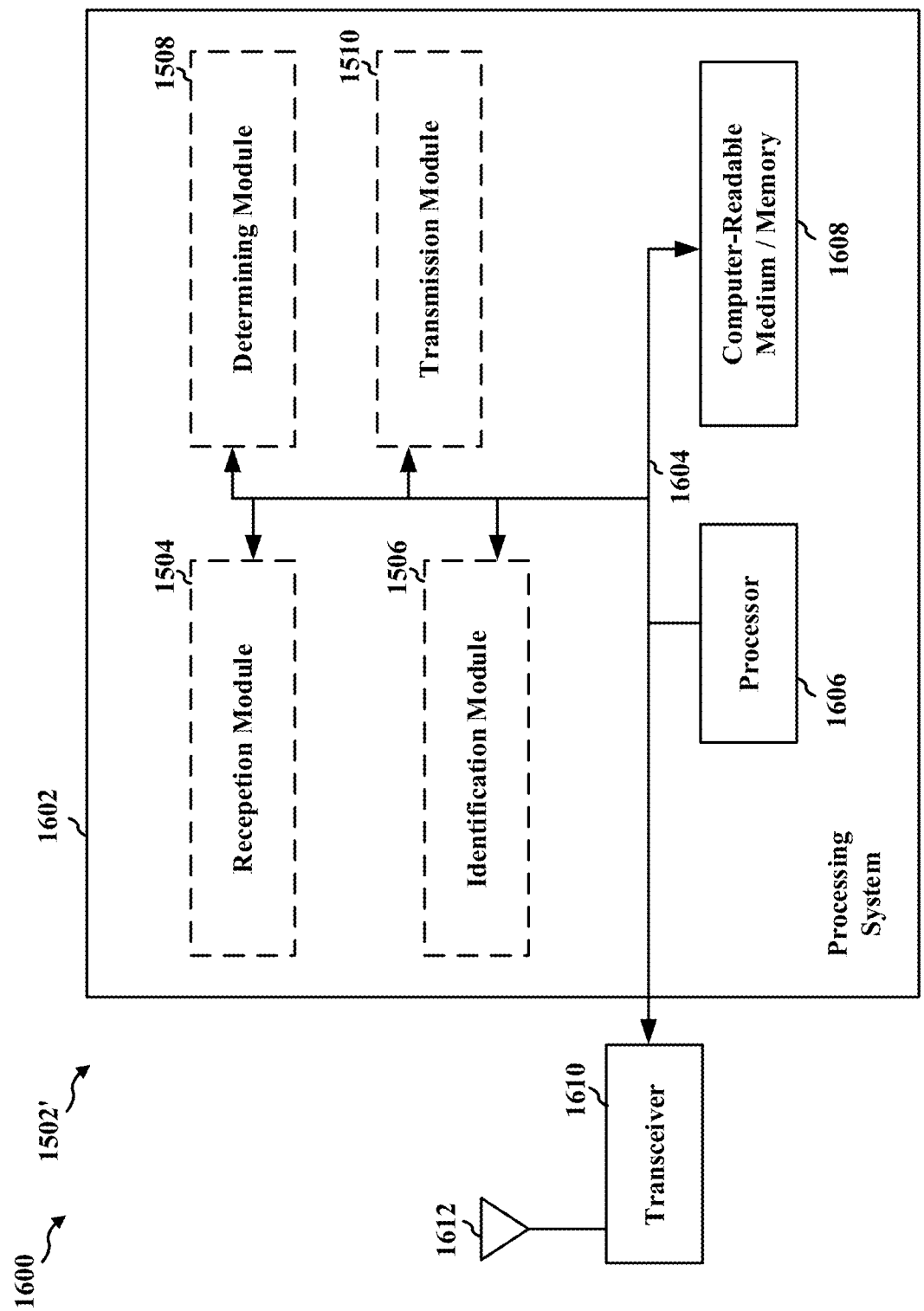
FIG. 16 is a diagram illustrating another example of a hardware implementation for an apparatus employing a processing system.

FIG. 16 is a diagram 1600 illustrating an example of a hardware implementation for an apparatus 1502' employing a processing system 1602. The apparatus 1502' may be a base station.

The processing system 1602 may be implemented with a bus architecture, represented generally by the bus 1604. The bus 1604 may include any number of interconnecting buses and bridges depending on the specific application of the processing system 1602 and the overall design constraints. The bus 1604 links together various circuits including one or more processors and/or hardware modules, represented by the processor 1606, the modules 1504, 1506, 1508, 1510, and the computer-readable medium/memory 1608. The bus 1604 may also link various other circuits such as timing sources, peripherals, voltage regulators, and power management circuits, which are well known in the art, and therefore, will not be described any further.

The processing system 1602 may be coupled to a transceiver 1610. The transceiver 1610 is coupled to one or more antennas 1612. The transceiver 1610 provides a means for communicating with various other apparatus over a transmission medium. The transceiver 1610 receives a signal from the one or more antennas 1612, extracts information from the received signal, and provides the extracted information to the processing system 1602, specifically the reception module 1504. In addition, the transceiver 1610 receives information from the processing system 1602, specifically the transmission module 1510, and based at least in part on the received information, generates a signal to be applied to the one or more antennas 1612. The processing system 1602 includes a processor 1606 coupled to a computer-readable medium/memory 1608. The processor 1606 is responsible for general processing, including the execution of software stored on the computer-readable medium/memory 1608. The software, when executed by the processor 1606, causes the processing system 1602 to perform the various functions described supra for any particular apparatus. The computer-readable medium/memory 1608 may also be used for storing data that is manipulated by the processor 1606 when executing software. The processing system 1602 further includes at least one of the modules 1504, 1506, 1508, and/or 1510. The modules may be software modules running in the processor 1606, resident/stored in the computer readable medium/memory 1608, one or more hardware modules coupled to the processor 1606, or some combination thereof. The processing system 1602 may be a component of the base station 110 and may include the memory 242 and/or at least one of the TX MIMO processor 230, the RX processor 238, and/or the controller/processor 240.

In some aspects, the apparatus 1502/1502' for wireless communication includes means for identifying a wakeup signal resource associated with a UE, means for determining whether a control channel search space is to include control information associated with the UE, means for selectively transmitting a wakeup signal in the wakeup signal resource, and/or the like. The aforementioned means may be one or more of the aforementioned modules of the apparatus 1502 and/or the processing system 1602 of the apparatus 1502' configured to perform the functions recited by the aforementioned means. As described supra, the processing system 1602 may include the TX MIMO processor 230, the RX processor 238, and/or the controller/processor 240. As such, in one configuration, the aforementioned means may be the TX processor 230, the RX processor 238, and/or the controller/processor 240 configured to perform the functions recited by the aforementioned means.

FIG. 16 is provided as an example. Other examples are possible and may differ from what was described in connection with FIG. 16.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
identifying, by a user equipment (UE), a wakeup signal resource associated with the UE based at least in part on a control channel search space resource associated with the UE, wherein the wakeup signal resource maps to the control channel search space resource and precedes the control channel search space resource, and wherein a wakeup signal in the wakeup signal resource is a simple wakeup signal that includes information regarding use of a control channel;
monitoring, by the UE, the wakeup signal resource for an indication of whether to monitor the control channel search space resource; and
selectively monitoring, by the UE, the control channel search space resource based at least in part on the indication of whether to monitor the control channel search space resource.

2. The method of claim 1,
wherein the UE is configured to initiate a wakeup procedure to monitor the control channel search space resource when the monitoring of the wakeup signal resource indicates that the control channel search space resource is to be monitored, or
wherein the UE is configured to sleep during the control channel search space resource when the monitoring of the wakeup signal resource indicates that the control channel search space resource is not to be monitored.

3. The method of claim 1, wherein the wakeup signal resource maps to a plurality of control channel search space resources.

4. The method of claim 3, wherein the plurality of control channel search space resources are associated with the UE.

5. The method of claim 3, wherein the plurality of control channel search space resources are associated with a plurality of UEs.

6. The method of claim 1, wherein the wakeup signal resource is identified based at least in part on a periodicity or a time offset associated with the wakeup signal resource.

7. The method of claim 1, wherein the wakeup signal resource is identified based at least in part on at least one of:
a UE identifier associated with the UE,
a radio network temporary identifier (RNTI) associated with control channel communications monitored by the UE,
a signal-to-noise ratio associated with the UE,
a maximum repetition level associated with the UE,
an actual repetition level associated with control channel communications for the UE,
a carrier index associated with the control channel search space resource, or
some combination thereof.

8. The method of claim 1, wherein the wakeup signal resource occurs before the control channel search space resource with no intervening wakeup signal resources associated with the UE.

9. The method of claim 1, wherein the wakeup signal resource occurs a number of subframes before the control channel search space resource.

10. The method of claim 1, wherein a payload size of the wakeup signal is less than a payload size used for legacy downlink control information in a control channel that includes the control channel search space resource.

11. The method of claim 1, wherein the wakeup signal indicates one or more UEs that are to monitor the control channel search space resource.

12. The method of claim 1, wherein the wakeup signal resource is identified or monitored based at least in part on a wakeup signal mode determined based at least in part on whether a wakeup signal is being used for connected mode discontinuous reception (CDRX).

13. The method of claim 1, wherein the control channel uses complex signals that are different from the simple wakeup signal.

14. A user equipment (UE) for wireless communication, comprising:
a memory; and
one or more processors operatively coupled to the memory, the memory and the one or more processors configured to:
identify a wakeup signal resource associated with the UE based at least in part on a control channel search space resource associated with the UE, wherein the wakeup signal resource maps to the control channel search space resource and precedes the control channel search space resource, and wherein a wakeup signal in the wakeup signal resource a simple wakeup signal that includes information regarding use of a control channel;
monitor the wakeup signal resource for an indication of whether to monitor the control channel search space resource; and
selectively monitor the control channel search space resource based at least in part on the indication of whether to monitor the control channel search space resource.

15. The UE of claim 14, wherein the wakeup signal resource maps to a plurality of control channel search space resources.

16. The UE of claim 14, wherein the wakeup signal resource is identified based at least in part on a periodicity or a time offset associated with the wakeup signal resource.

17. The UE of claim 14, wherein the wakeup signal resource occurs before the control channel search space resource with no intervening wakeup signal resources associated with the UE.

18. The UE of claim 14, wherein the wakeup signal resource occurs a number of subframes before the control channel search space resource.

19. The UE of claim 14, wherein a payload size of the wakeup signal is less than a payload size used for legacy downlink control information in a control channel that includes the control channel search space resource.

20. The UE of claim 14, wherein the control channel uses complex signals that are different from the simple wakeup signal.

21. An apparatus for wireless communication, comprising:
means for identifying a wakeup signal resource associated with the apparatus based at least in part on a control channel search space resource associated with the apparatus, wherein the wakeup signal resource maps to the control channel search space resource and precedes the control channel search space resource, and wherein a wakeup signal in the wakeup signal resource is a simple wakeup signal that includes information regarding use of a control channel:
means for monitoring the wakeup signal resource for an indication of whether to monitor the control channel search space resource; and means for selectively monitoring the control channel search space resource based at least in part on the indication of whether to monitor the control channel search space resource.

22. The apparatus of claim 21, wherein the wakeup signal resource maps to a plurality of control channel search space resources.

23. The apparatus of claim 21, wherein the wakeup signal resource is identified based at least in part on a periodicity or a time offset associated with the wakeup signal resource.

24. The apparatus of claim 21, wherein the wakeup signal resource occurs before the control channel search space resource with no intervening wakeup signal resources associated with the apparatus.

25. The apparatus of claim 21, wherein the wakeup signal resource occurs a number of subframes before the control channel search space resource.

26. The apparatus of claim 21, wherein a payload size of the wakeup signal is less than a payload size used for legacy downlink control information in a control channel that includes the control channel search space resource.

27. The apparatus of claim 21, wherein the control channel uses complex signals that are different from the simple wakeup signal.

* * * * *